United States Patent [19]
Sugahara

[11] Patent Number: 6,167,157
[45] Date of Patent: Dec. 26, 2000

[54] METHOD OF REDUCING QUANTIZATION NOISE GENERATED DURING A DECODING PROCESS OF IMAGE DATA AND DEVICE FOR DECODING IMAGE DATA

[75] Inventor: Takayuki Sugahara, Kanagawa-ken, Japan

[73] Assignee: Victor Company of Japan, Ltd., Yokohama, Japan

[21] Appl. No.: 09/205,986

[22] Filed: Dec. 4, 1998

Related U.S. Application Data

[62] Division of application No. 08/561,350, Nov. 21, 1995, Pat. No. 5,949,908.

[30] Foreign Application Priority Data

| Nov. 24, 1994 | [JP] | Japan | 6-314161 |
| Dec. 20, 1994 | [JP] | Japan | 6-334842 |
| Jan. 26, 1995 | [JP] | Japan | 7-030145 |

[51] Int. Cl.[7] .................................................. G06K 9/36
[52] U.S. Cl. ................................................................ 382/236
[58] Field of Search ................................... 382/232, 233, 382/236, 238, 240, 248, 250; 358/432, 433; 348/384, 394, 395, 400–404, 407–416, 420–421, 425, 430, 431, 699

[56] References Cited

U.S. PATENT DOCUMENTS

| 4,794,455 | 12/1988 | Ericsson . |
| 4,816,914 | 3/1989 | Ericsson . |
| 4,849,810 | 7/1989 | Ericsson . |
| 5,089,889 | 2/1992 | Sugiyama . |
| 5,134,477 | 7/1992 | Knauer et al. . |
| 5,146,325 | 9/1992 | Ng ........................................... 382/236 |
| 5,237,410 | 8/1993 | Inoue . |
| 5,265,180 | 11/1993 | Golin ....................................... 382/236 |
| 5,267,334 | 11/1993 | Normille et al. ........................ 382/236 |
| 5,325,125 | 6/1994 | Naimpally et al. . |
| 5,359,676 | 10/1994 | Fan . |
| 5,367,385 | 11/1994 | Yuan . |
| 5,379,356 | 1/1995 | Burcell et al. ........................... 382/236 |
| 5,479,211 | 12/1995 | Fukuda . |
| 5,552,332 | 9/1996 | Tseng et al. . |
| 5,552,832 | 9/1996 | Astle . |
| 5,559,676 | 9/1996 | Gessaman . |
| 5,570,133 | 10/1996 | Yagasaki ................................. 382/236 |
| 5,590,064 | 12/1996 | Astle . |
| 5,644,660 | 7/1997 | Bruder .................................... 382/236 |
| 5,757,968 | 5/1998 | Ando ....................................... 382/236 |
| 5,793,428 | 8/1998 | Coelho .................................... 382/236 |

FOREIGN PATENT DOCUMENTS

| 0 490 799 A1 | 6/1992 | European Pat. Off. . |
| 0 566 202 A1 | 10/1993 | European Pat. Off. . |
| 4-2275 | 7/1992 | Japan . |
| 4-372074 | 12/1992 | Japan . |
| 05308623 | 11/1993 | Japan . |
| 06078276 B1 | 3/1994 | Japan . |
| 06209457 B1 | 7/1994 | Japan . |
| 2287 153 | 6/1995 | United Kingdom . |

OTHER PUBLICATIONS

Yasuyuki, Nakajima, "Postprocessing Algorithms for Noise Reduction of MPEG Coded Video", Technical Report of IEICE, IE94–7, DSP94–7 (1994–04), pp. 45–51.

*Primary Examiner*—Jose L. Couso
*Attorney, Agent, or Firm*—Anderson, Kill & Olick P.C.

[57] ABSTRACT

A device for decoding coded image data divided into a plurality of blocks so as to generate decoded image data by applying an inverse orthogonal transformation to each block of the plurality of blocks includes a quantization-information detecting unit detecting block-quantization-step-size information indicative of quantization step sizes used for the plurality of blocks. The device also includes a variable-gain-low-pass filter reducing high frequency components of the decoded image data in a predetermined proximity of borders of the plurality of blocks based on the block-quantization-step-size information, the high frequency components having frequencies higher than a predetermined frequency.

1 Claim, 24 Drawing Sheets

FIG.4

|  | n−1 | n+1 | n | n+1 | n+2 | n+3 |
|---|---|---|---|---|---|---|
| m−2 |  |  |  |  |  |  |
| m−1 |  |  | Q (n, m−1) |  |  |  |
| m |  | Q (n−1, m) | Q (n, m) | Q (n+1, m) |  |  |
| m+1 |  |  | Q (n, m+1) |  |  |  |
| m+2 |  |  |  |  |  |  |

|  | MV1 | MV2 | MV3 |  |
|---|---|---|---|---|
|  | MV4 | MV0 | MV45 |  |
|  | MV6 | MV7 | MV8 |  |

METHOD OF REDUCING QUANTIZATION NOISE GENERATED DURING A DECODING PROCESS OF IMAGE DATA AND DEVICE FOR DECODING IMAGE DATA

This application is a division of U.S. patent application Ser. No. 08/561,350, filed Nov. 21, 1995, now U.S. Pat. No. 5,949,908.

BACKGROUND OF THE INVENTION

1. Field of the Invention

The present invention generally relates to noise reduction methods and image decoding devices, and particularly relates to a method of reducing quantization noise generated during a decoding process of coded image data and to a device for decoding the coded image data based on the method.

2. Description of the Related Art

When transmitting, recording, or reproducing various signals such as video signals, audio signals, etc., as digital signals, techniques for compressing and decompressing information are generally employed to reduce the amount of information, i.e., the number of bits. For example, if a linear quantization (uniform quantization) which represents each sample value with a value selected from evenly divided signal levels is used for digitizing video signals;, audio signals, and the like without any compression technique, the amount of information to be transmitted or recorded/reproduced becomes prohibitively large.

Thus, in the fields of broadcasting, communication, and information recording/reproducing, characteristics of human visual perception and auditory perception have been utilized in such compression techniques. For example, the human perception is sensitive to changes in signal levels when a signal has a little variation, while it is not so sensitive to the changes when a signal has a strong fluctuation. Such characteristics can be utilized to reduce the amount of information for each sample value. Also, a number of technologies for compressing information have been employed to bring about an advance in the practical use of highly efficient compression techniques.

For example, the amount of information contained in a one-hour moving picture having an image quality similar to those reproduced by VHS-type VTR devices is about 109 Gbits. Also, 360 Gbits more or less are contained in such a one-hour moving picture with an image quality comparable to reception images of NTSC color-television sets. Thus, an effort to develop highly efficient compression techniques is also directed to application studies aimed at transmitting or recording/reproducing such a large amount of information by means of current transmission lines or recording media.

Highly efficient compression methods which have been proposed as practical methods for image-information application typically combine three different compression techniques to reduce the amount of information. The first technique reduces the amount of information by utilizing correlation within an image frame (compression utilizing spatial correlation), which takes advantage of the fact that there is high correlation between adjacent pixels in natural images. The second technique reduces the amount of information by utilizing correlation between image frames arranged in time (compression utilizing temporal correlation). The third technique reduces the amount of information by utilizing a different probability of appearance of each code.

As techniques for compressing image information by utilizing correlation within an image frame (the first technique), a variety of techniques have been proposed. In recent years, orthogonal transformation such as the K-L (Karhunen-Loève) transform, the Discrete Cosine Transform (DCT), the discrete Fourier transform, and the Walsh-Hadamard transform have often been employed.

For example, highly efficient coding methods for image information proposed by the MPEG (moving picture coding expert group) which has been established under the ISO (international standardization organization) employ two-dimensional DCT. These highly efficient coding methods (MPEG1 and MPEG2) combine intra-frame coding and inter-frame coding to realize highly efficient coding of moving-picture information while employing motion compensation prediction and inter-frame prediction. The orthogonal transformation is generally applied to blocks which are generated by dividing an image into unit blocks having a predetermined block size (M×N). In MPEG1 and MPEG2, a block having an 8-pixel-by-8-pixel block size is defined as a unit block.

M×N orthogonal transform coefficients which are obtained by orthogonally transforming the unit block (e.g., 64 DCT transform coefficients in MPEG1 and MPEG2) are then quantized by using block-quantization step sizes (intervals for quantization). The block-quantizatoin step sizes are defined for each predetermined-size area including at least one unit block. In MPEG1 and MPEG2, for example, this predetermined-size area is called a macro block, which consists of a block of 16×16 pixels for a luminance signal Y and a block of 8×8 pixels for each of color signals Cr and Cb. In detail, the block-quantization step sizes are represented as [{a quantization characteristic of a macro block (a quantization scale of a macro block) QS}×quantization matrix (8×8)]. Here, the quantization characteristic of a macro block changes from macro block to macro block.

The orthogonal transform coefficients (e.g., DCT coefficients) which are quantized based on the block-quantization step sizes are separated into a direct current component (DC component) and alternating current components (AC components). The direct current component of the orthogonal transform coefficients is subjected to differential coding, and the alternating current components of the orthogonal transform coefficients are subjected to entropy coding after a zigzag scan. Here, the entropy coding is an information compression technique using a variable-length coding scheme which utilizes a different probability of appearance of each code such as in the Huffman coding.

Transformed and coded image data is transmitted as a bit stream (a series of bits). A decoding operation on the transformed and coded image data is carried out in a reversed manner to the coding operation described above so as to generate an output image. However, when the quantization process is included in the entire coding process, unavoidable quantization errors result in quantization noise appearing in the output image. Thus, when the complexity of an image subjected to the coding process contains a larger amount of information than capacity of a transmission rate, the quantization noise will substantially degrade image quality.

In general, the quantization errors in low-frequency components result in block distortions in the output image, by which there appears to be no correlation between each block of the output image. Also, the quantization errors in high-frequency components generate mosquito noise around edges, which is a distortion having a ringing appearance in the output image.

The quantization errors appearing in the output image are especially conspicuous where image levels are generally flat. When a small amount of the quantization noise is added at a point where a change in a video signal level has frequency components from low frequencies to high frequencies, the noise is difficult to be visually detected because of characteristics of visual perception. However, when a small amount of noise having high frequency components is added at a point where a change in the video signal has only low frequency components, the noise is easy to detect. Of course, when a large amount of noise is added, the noise is detected as coding degradation irrespective of the frequency components of the noise.

In order to obviate the problem of an image-quality degradation caused by the quantization noise, Japanese Laid-Open Patent Application No. 4-2275 discloses a technique for reducing the quantization errors in low frequency components which appear as block distortion in an image. The technique detects an activity value (the amount of high frequency components contained in a given block of image data) for a given block. Based on the activity value, pixels near the borders of the given block are processed by a low-pass filter, and, then, random noise is added to these pixels processed by the low-pass filter.

However, this technique has a problem when the image degradation is substantial as in the case where an image to be subjected to highly efficient coding is relatively complex in comparison with a transmission rate. In such a case, the quantization noise causing the image degradation is mistakenly detected as part of the activity value of the decoded image. Thus, even if a block is of a low activity value, this block might be mistakenly judged as having a high activity value. That is, it is difficult to determine whether the activity value detected in the decoded image reflects a real activity value inherent in the image data or reflects the quantization noise sneaking into the image data. As a result, the technique described above cannot effectively reduce the block distortion generated during the decoding process of the coded image data.

Accordingly, there is a need for a method which can effectively reduce the quantization noise generated during a decoding process of coded image data, and for a device for decoding the coded image data based on this method.

SUMMARY OF THE INVENTION

Accordingly, it is a general object of the present invention to provide a method and a device which can satisfy the need described above.

It is another and more specific object of the present invention to provide a method which can effectively reduce the quantization noise generated during a decoding process of coded image data, and for a device for decoding the coded image data based on this method.

In order to achieve the above objects according to the present invention, a device for decoding coded image data divided into a plurality of blocks so as to generate decoded image data by applying an inverse orthogonal transformation to each block of the plurality of blocks includes a quantization-information detecting unit detecting block-quantization-step-size information indicative of quantization step sizes used for the plurality of blocks. The device also includes a variable-gain-low-pass filter reducing high frequency components of the decoded image data in a predetermined proximity to borders of the plurality of blocks based on the block-quantization-step-size information, the high frequency components having frequencies higher than a predetermined frequency.

The same objects can also be achieved according to the present invention by a method of reducing quantization noise from decoded image data which is decoded from coded image data divided into a plurality of blocks by applying an inverse orthogonal transformation to each block of the plurality of blocks. The method includes the steps of detecting block-quantization-step-size information indicative of quantization step sizes used for the plurality of blocks, and reducing high frequency components of the decoded image data in a predetermined proximity to borders of the plurality of blocks based on the block-quantization-step-size information, the high frequency components having frequencies higher than a predetermined frequency.

In the device and the method described above, the high frequency components are reduced in the predetermined proximity to the borders of the blocks according to the block-quantization-step-size information. Thus, the reduction amount of the block distortion can be controlled based on the block-quantization step sizes. The block distortion can be reduced by a greater amount when the block-quantization step sizes are larger. Also, the block distortion can be reduced by taking into account differences in the block-quantization step sizes between a given block and neighboring blocks. Thus, the quantization noise generated during the decoding process of coded image data can be effectively reduced.

The same objects are also achieved according to the present invention by another device for decoding coded image data divided into a plurality of blocks so as to generate decoded image data, by applying an inverse orthogonal transformation to each block of the plurality of blocks. The device includes a prediction-mode detecting unit detecting a prediction mode used for the plurality of blocks, the prediction mode indicating either an intra-frame coding mode or an inter-frame coding mode, and a variable-gain-low-pass filter reducing high frequency components of the decoded image data in a predetermined proximity to borders of the plurality of blocks based on the prediction mode, the high frequency components having frequencies higher than a predetermined frequency.

In the device described above, the high frequency components are reduced in the predetermined proximity of the borders of the blocks according to the prediction modes used in these blocks. Thus, the reduction amount of the block distortion can be controlled based on the prediction mode. The block distortion may be reduced when the prediction mode indicates the intra-frame coding, but not reduced when the prediction mode indicates the inter-frame coding. Thus, the quantization noise generated during the decoding process of coded image data can be effectively reduced.

Furthermore, the same objects are also achieved according to the present invention by still another device for decoding coded image data divided into a plurality of blocks so as to generate decoded image data by applying an inverse orthogonal transformation to each block of the plurality of blocks. The device includes a motion-vector detecting unit detecting motion vectors of the plurality of blocks, and a variable-gain-low-pass filter reducing high frequency components of the decoded image data in the plurality of blocks based on the motion vectors, the high frequency components having frequencies higher than a predetermined frequency.

In the device described above, the high frequency components are reduced according to the motion vectors of the blocks. Thus, the reduction amount of the quantization noise can be controlled based on the motion vectors. The quantization noise can be reduced in a given block by a greater amount when the motion vector of that block is larger. Also, the quantization noise can be reduced in a given block by a greater amount when the motion vector of the given block differs by a greater amount from the motion vectors of neighboring blocks. Thus, the quantization noise generated during the decoding process of coded image data can be effectively reduced.

Furthermore, the same objects are also achieved according to the present invention by yet another device for decoding coded image data divided into a plurality of blocks so as to generate decoded image data by applying an inverse orthogonal transformation to each block of the plurality of blocks. The device includes an orthogonal-transformation-information detecting unit for detecting a orthogonal-transformation structure in which an orthogonal transformation is applied to a given block, the orthogonal-transformation structure being one of a field structure or a frame structure, and a low-pass filter unit for applying a low-pass filtering operation of a given structure to the given block of the decoded image data in a vertical direction thereof, the given structure being one of the field structure and the frame structure and dependent on the orthogonal-transformation structure.

In the device described above, the decoded image is subjected to the low-pass filtering operation according to a structure used in the orthogonal transformation of the given block. Thus, the quantization noise is reduced by the low-pass filtering operation, and the amount of the reduction can be controlled based on the orthogonal-transformation structure. The low-pass filtering operation of the field structure may be applied to the given block when the orthogonal-transformation structure is the field structure, and the low-pass filtering operation of the frame structure may be applied to the given block when the orthogonal-transformation structure is the frame structure. Thus, the quantization noise generated during the decoding process of coded image data can be effectively reduced.

Other objects and further features of the present invention will be apparent from the following detailed description when read in conjunction with the accompanying drawings.

BRIEF DESCRIPTION OF THE DRAWINGS

FIG. 4 is a illustrative drawing showing the currently processed block and neighboring blocks thereof;

DESCRIPTION OF THE PREFERRED EMBODIMENTS

In the following, embodiments of the present invention will be described with reference to accompanying drawings.

Figure 1:
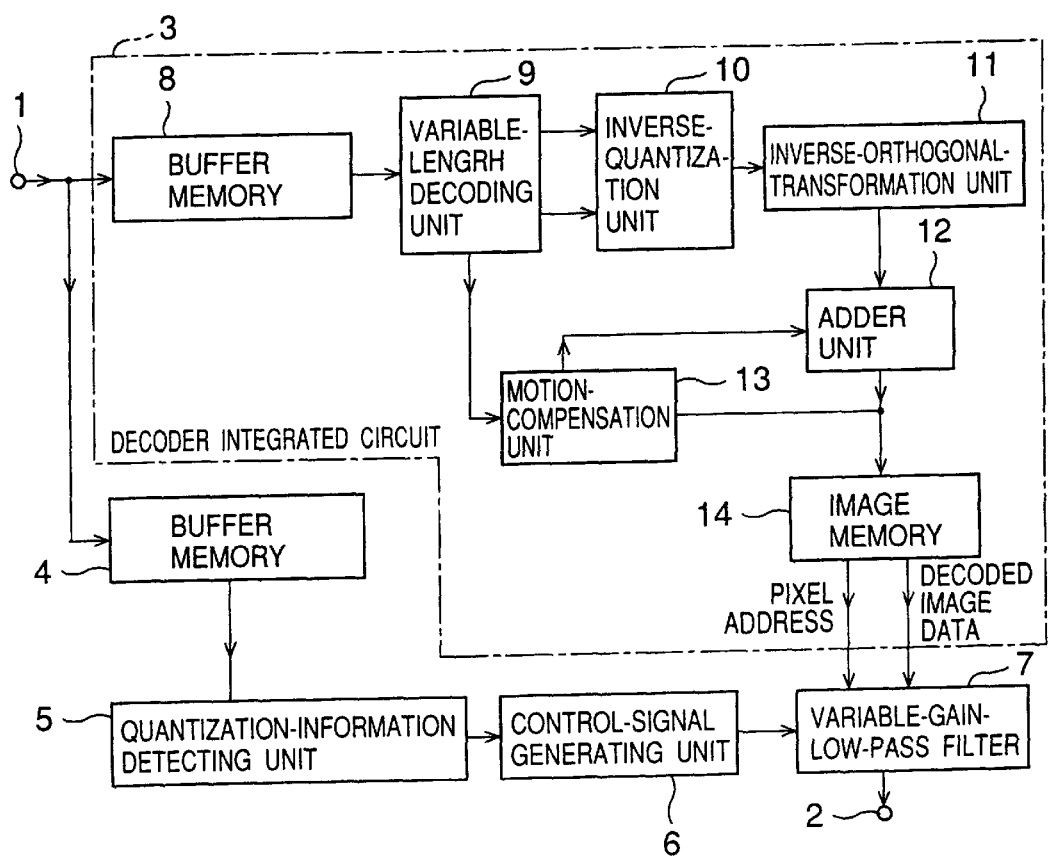
FIG. 1 is a block diagram of an image-data decoding device according to a first embodiment of the present invention.

FIG. 1 is a block diagram of an image-data decoding device according to a first embodiment of the present invention. In FIG. 1, an input node which receives a bit stream (a series of bits) to be decoded is designated by reference number 1. Also, a portion enclosed by a dashed line 3 is implemented by an integrated circuit. The portion enclosed by the dashed line 3 includes a buffer memory 8, a variable-length decoding unit 9, an inverse-quantization unit 10, an inverse-orthogonal-transformation unit 11, an adder unit 12, a motion-compensation unit 13, and an image memory 14. An integrated circuit for this portion is commercially available.

The bit stream provided to the input node 1 is image data which is encoded through a highly efficient coding method such as the MPEG1 or the MPEG2 using a combination of the three different compression techniques described before, i.e., compression by using an orthogonal transformation utilizing correlation within an image frame (compression utilizing spatial correlation), compression by utilizing correlation between image frames arranged in time (compression utilizing temporal correlation), and compression by utilizing a different probability of appearance of each code. In a description provided below, it is assumed that the image data to be decoded is generated by MPEG1 or MPEG2.

The highly efficient coding of moving picture information through MPEG1 or MPEG2 uses a combination of intra-frame coding through the two-dimensional Discreet Cosine Transform (two-dimensional DCT) and inter-frame coding, and, also, employs the motion-compensation prediction and the inter-frame prediction. An image signal of each image subjected to the highly efficient coding is divided into the unit block having an 8-pixel-by-8-pixel block size (8 pixels in a horizontal direction and 8 lines in a vertical direction) with the DCT applied to each unit block.

The sixty-four DCT transform coefficients obtained for each unit block are quantized by using the block-quantization step sizes. In the MPEG1 and the MPEG2, the block-quantization threshold values are defined for each macro block, which is a predetermined-size area including at least one unit block and consists of a block of 16×16 pixels for the luminance signal Y and a block of 8×8 pixels for each of the color signals Cr and Cb. In detail, the block-quantization step sizes are represented as [{the quantization characteristic of a macro block (the quantization scale of a macro block) QS}×quantization matrix (8×8)]. Here, the quantization characteristic of a macro block (the quantization scale of a macro block) QS is a scale factor which changes from macro block to macro block.

DCT coefficients which are obtained through the quantization process dividing the DCT transform coefficients by the block-quantization step sizes are then separated into the direct current component (DC component) and the alternating current components (AC components). The direct current component of the DCT coefficients is subjected to differential coding, and the alternating current components of the DCT coefficients are subjected to entropy coding (variable-length coding scheme utilizing a different probability of appearance of each code such as in the Huffman coding) after a zigzag scan.

Then, a bit stream is generated in which information necessary for the decoding process is attached to the transformed and coded image data. Here, the information necessary for the decoding process includes information regarding the block-quantization step sizes (e.g., the quantization scale of a macro block QS) and information regarding motion vectors and prediction modes, etc. In the image-data decoding device of FIG. 1, the bit stream supplied to the input node 1 is stored in the buffer memory 8, which is made up from a First-In-First-Out (FIFO) memory.

The variable-length decoding unit 9 receives the bit stream read from the buffer memory 8, and decodes the image data coded through the entropy coding (variable-length coding) and the attached information which is necessary for decoding the transformed and coded image data. (Such information includes block-quantization-step-size information (the quantization characteristic of a macro block QS) and information regarding motion vectors and prediction modes, etc.) Then, the image data and the block-quantization-step-size information (the quantization scale of a macro block QS) decoded by the variable-length decoding unit 9 is supplied to the inverse-quantization unit 10. Also, the information regarding notion vectors, prediction modes, etc., is provided to the motion-compensation unit 13.

The inverse-quantization unit 10 which receives the image data and the block-quantization-step-size information (QS) obtains the DCT transform coefficients through an inverse-quantization operation, and provides them to the inverse-orthogonal-transformation (inverse-DCT) unit 11. The inverse-orthogonal-transformation (inverse-DCT) unit 11 applies the two-dimensional inverse DCT to each unit block to convert the image data in the frequency domain to the image data in the time domain. Resulting image data in the time domain is supplied to the adder unit 12.

At the adder unit 12, the image data in the time domain may be added to motion-compensated image data obtained by the motion-compensation unit 13, depending on a coding type indicating either one of the intra-frame coding or the inter-frame coding. Output image data from the adder unit 12 is stored in the image memory 14.

Figure 2:
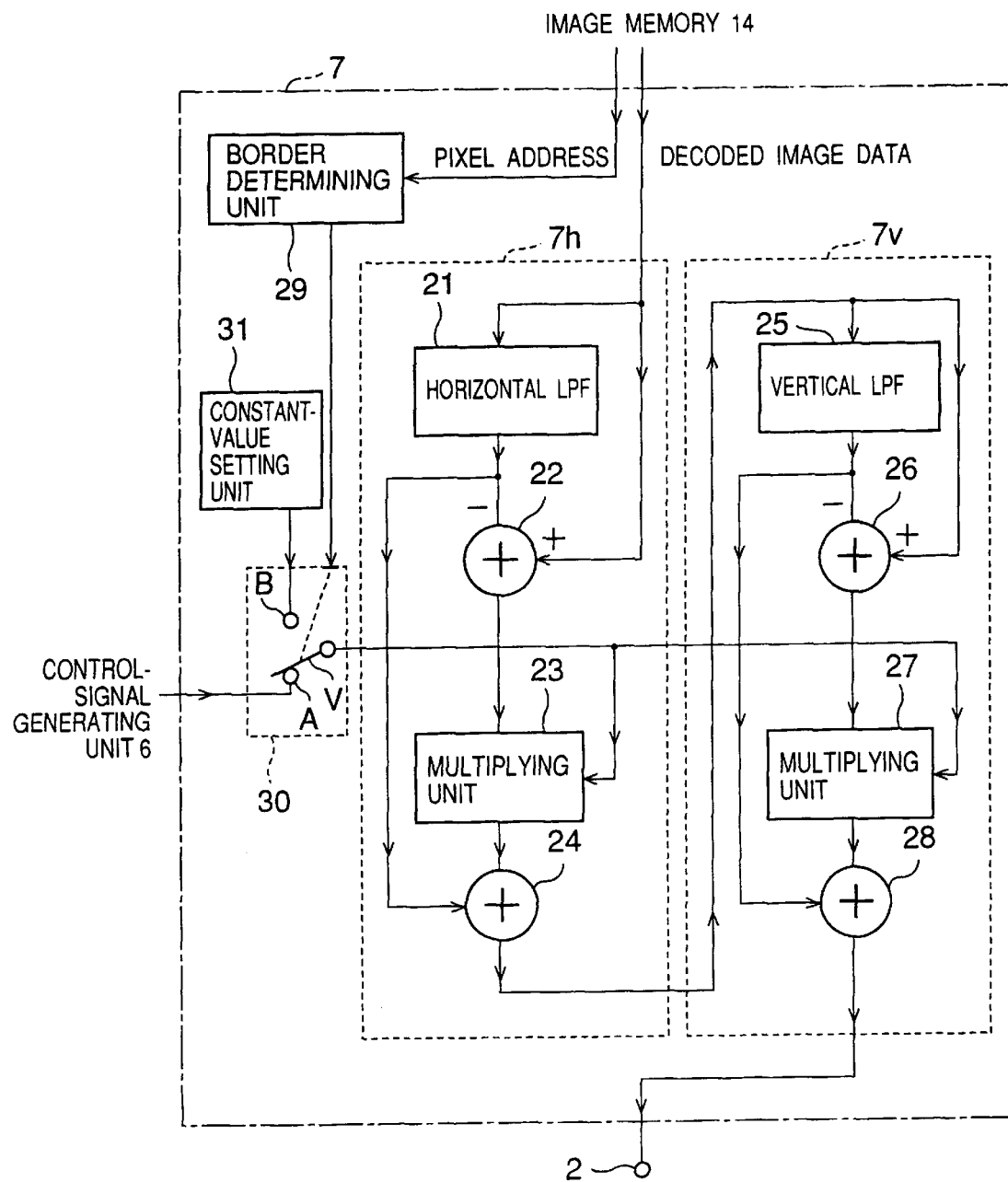
FIG. 2 is a block diagram of the variable-gain-low-pass filter of FIG. 1.

In the image-data decoding device of FIG. 1, the image data provided from the image memory 14 is output at an output node 2 via a variable-gain-low-pass filter 7. The variable-gain-low-pass filter 7 is controlled by a control signal provided from a control-signal generating unit 6 to change a signal level of high frequency components of the image. FIG. 2 is a block diagram of the variable-gain-low-pass filter 7.

In FIG. 2, a portion enclosed by a dotted line 7h serves to reduce high frequency components in a horizontal direction of the image. Also, a portion enclosed by a dotted line 7v serves to reduce high frequency components in a vertical direction of the image.

The portion enclosed by the dotted line 7h and the portion enclosed by the dotted line 7v are connected in series. Thus, both portions form a variable-gain-low-pass filter for two-dimensionally reducing the high frequency components of the decoded image.

In FIG. 2, the portion enclosed by the dotted line 7h includes a horizontal LPF 21 having a predetermined cut-off frequency, a subtracting unit 22, a multiplying unit 23, and an adder unit 24. Also, the portion enclosed by the dotted line 7v includes a vertical LPF 25 having a predetermined cut-off frequency, a subtracting unit 26, a multiplying unit 27, and an adder unit 28.

Instead of the configuration shown in FIG. 2, the variable-gain-low-pass filter 7 may include only one two-dimensional LPF, one multiplying unit, and one adder. The variable-gain-low-pass filter 7 having the latter configuration can function in the same manner as the variable-gain-low-pass filter 7 of FIG. 2.

In FIG. 2, the multiplying unit 23 in the portion enclosed by the dotted line 7h and the multiplying unit 27 in the portion enclosed by the dotted line 7v are provided with the control signal from the control-signal generating unit 6. Then, each of the multiplying unit 23 and the multiplying unit 27 multiplies signal components in a frequency band higher than the predetermined cut-off frequency of a corresponding LPF by a coefficient ranging from 0 to 1.0.

Figure 3:
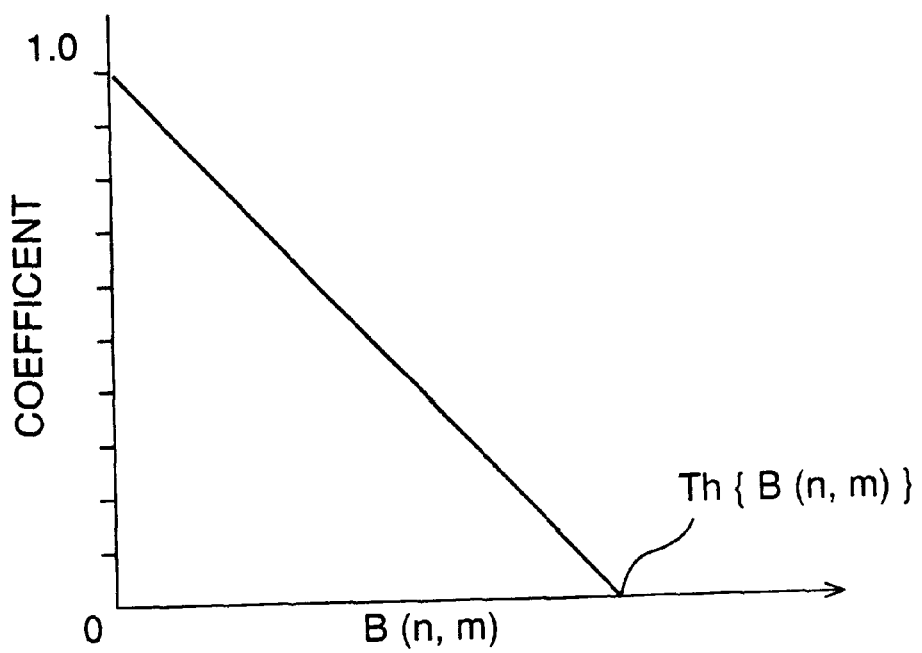
FIG. 3 is a chart showing an example of a relation between coefficients used in the variable-gain-low-pass filter and a measure B(n,m) derived from the block-quantization-step-size information.

FIG. 3 is a chart showing an example of the relation between the foregoing coefficient and a certain measure B(n,m) derived from the block-quantization-step-size information (e.g., the quantization scale of a macro block QS). The measure B(n,m) will be described later in detail.

The above-mentioned coefficient is used by the variable-gain-low-pass filter 7 such that the high-frequency components residing near borders of the blocks are reduced according to the block-quantization-step-size information. In detail, the measure B(n,m) for a given block (n,m) becomes larger as the block-quantization step sizes are larger for the given block (n,m). Also, the measure B(n,m) becomes larger as differences in the block-quantization step sizes are greater between the given block (n,m) and adjacent blocks. By using the coefficient derived from the measure B(n,m), the high-frequency components residing near the borders of the given block is reduced by a greater amount as the block-quantization step sizes used in the given block are larger and the differences in the block-quantization step sizes between the given block and the neighboring blocks are greater.

The measure B(n,m) is represented as:

$$B(n.m) = Q(n, m) + dQ \qquad (1)$$

$$dQ = \{|Q(n-1, m) - Q(m, n)| \qquad (2)$$
$$+|Q(n, m-1) - Q(m, n)|$$
$$+|Q(n+1, m) - Q(m, n)|$$
$$+|Q(n, m+1) - Q(m, n)|\}/4$$

wherein a currently processed block is designated by (n,m). FIG. 4 is a illustrative drawing showing the currently processed block and neighboring blocks thereof. Q(n,m) refers to the quantization scale which relates to the block-quantization step sizes used for quantizing the DCT transform coefficients of the currently processed block (n,m). Q(n,m−1), Q(n−1,m), Q(n+1,m), and Q(n,m+1) refer to the quantization scales of the neighboring blocks (n,m−1), (n−1, m), (n+1,m), and (n,m+1), which are arranged over, on the left side of, on the right side of, and under the currently processed block (n,m), respectively. The measure B(n,m) is calculated for the currently processed block which is successively shifted one by one in the image data. As shown in FIG. 4, the coefficient is limited to a range between 0 and 1, and remains at 0 when the measure B(n,m) exceeds a threshold value Th.

Figure 5:
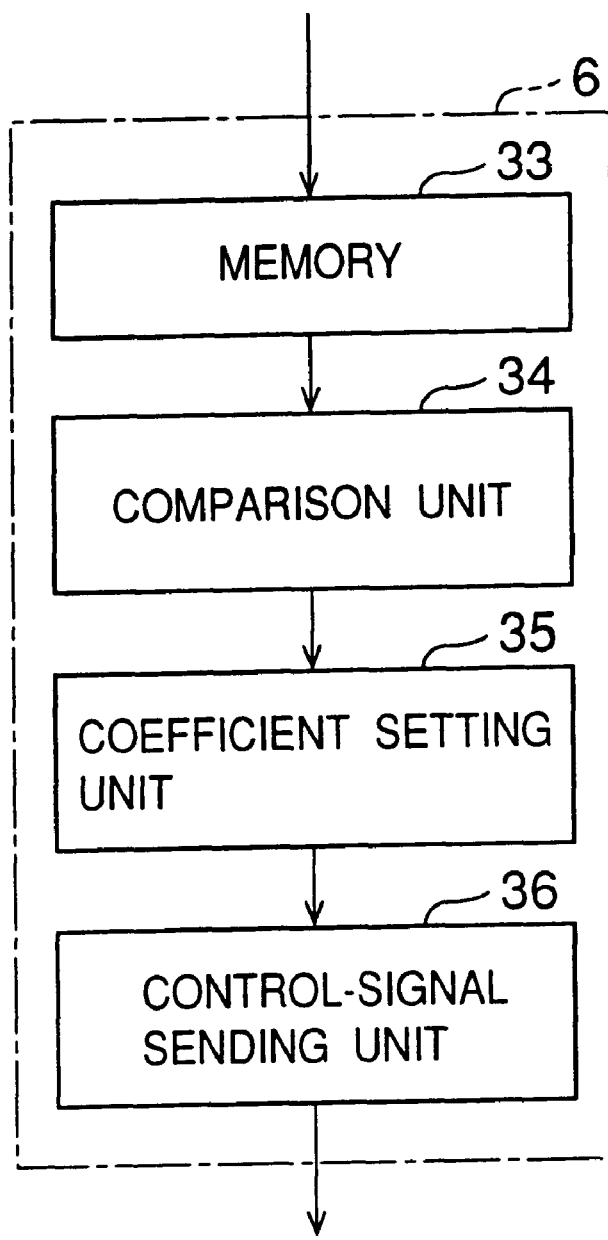
FIG. 5 is a block diagram of a control-signal generating unit of FIG. 1.

FIG. 5 is a block diagram of the control-signal generating unit 6 of FIG. 1 which generates the coefficient signal ranging from 0 to 1 and provides it to the variable-gain-low-pass filter 7. The control-signal generating unit 6 includes a memory 33, a comparison unit 34, a coefficient setting unit 35, and a control-signal sending unit 36.

The memory 33 has sufficient capacity to store more of the block-quantization-step-size information than is necessary for conducting relevant signal processing (e.g., at least 3 lines of an image). The memory 33 stores the block-quantization-step-size information in a sequence for each block.

The block-quantization-step-size information read out from the memory 33 is supplied to the comparison unit 34, where dQ of the equation (2) is calculated based on the block-quantization-step-size information of the neighboring blocks. Further, the comparison unit 34 calculates the measure B(n,m) of the currently processed block, and provides it to the coefficient setting unit 35.

The coefficient setting unit 35 receives the measure B(n, m) as an address of a ROM table, which outputs the control signal corresponding to a certain coefficient by using a relation as shown in the example of FIG. 3. The control signal is supplied to the variable-gain-low-pass filter 7 via the control-signal sending unit 36. In detail, the control signal supplied to the variable-gain-low-pass filter 7 is applied to a fixed node A of a switch 30 thereof (FIG. 2).

Figure 6:
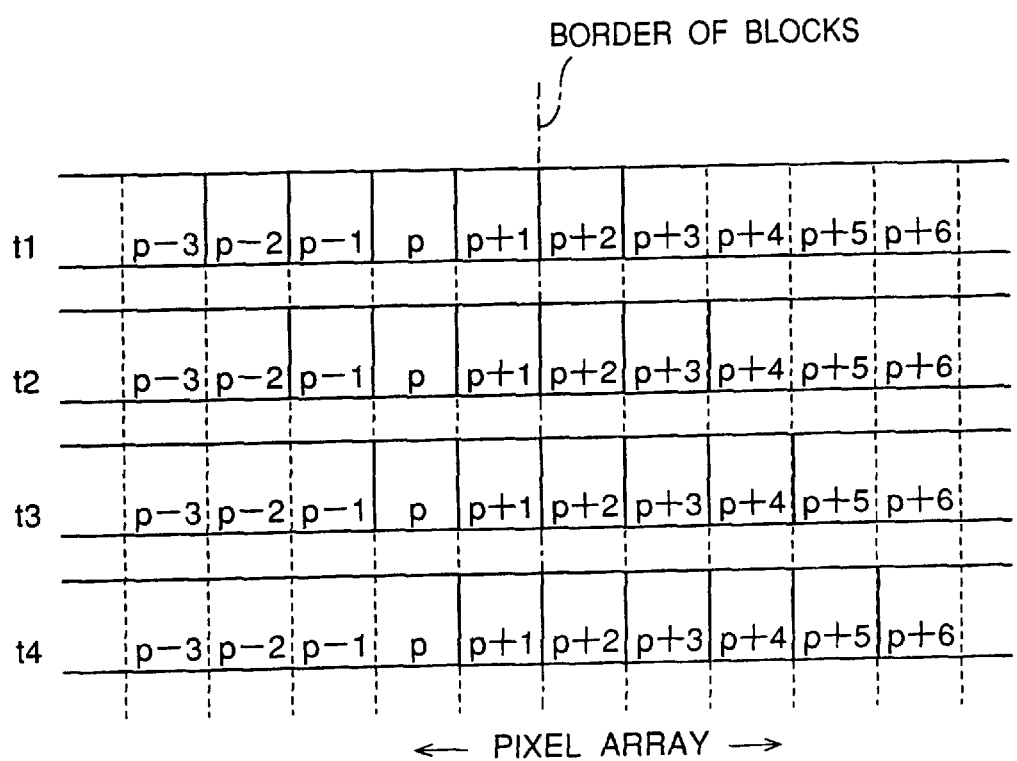
FIG. 6 is an illustrative drawing for explaining a filtering operation of the variable-gain-low-pass filter.

FIG. 6 is an illustrative drawing for explaining a filtering operation of the variable-gain-low-pass filter 7. As noted before, the variable-gain-low-pass filter 7 reduces the high-frequency components residing near borders of the blocks according to the block-quantization-step-size information, such that the reduction is stronger as the block-quantization step sizes used in the given block are larger and the differences in the block-quantization step sizes between the given block and the neighboring blocks are also larger.

In FIG. 6, t1, t2, t3, and t4 represent different points of time, each of which is delayed by one clock interval. Assume that the LPFs 21 and 25 of the variable-gain-low-pass filter 7 are FIR filters having a filter length of 5 taps. Pixels in a given one-line pixel array of the image are subjected to the low-pass filtering process. Then, pixels p−3 through p+6 shown in FIG. 6 located near a border of the blocks, for example, are subjected to the reduction process for reducing the high-frequency components.

In the variable-gain-low-pass filter 7 of FIG. 2, a border determining unit 29 receiving a pixel address generates an output signal when the pixel address is in a predetermined proximity of the border of the blocks. The border determining unit 29 sends the output signal thereof to the switch 30 as a switch controlling signal.

The fixed node A of the switch 30 of the variable-gain-low-pass filter 7 is provided with the control signal from the control-signal generating unit 6. Also, a fixed node B of the switch 30 is provided with a coefficient of 1.0 from a constant-value setting unit 31. The switch controlling signal provided from the border determining unit 29 indicating that a current pixel is in the predetermined proximity of the border controls the switch 30 to couple a movable node V to the fixed node A instead of the fixed node B.

Accordingly, when the current pixel is not within the predetermined proximity of the border of the blocks, the switch 30 provides the coefficient of 1.0 to the multiplying units 23 and 27 via the fixed node B and the movable node V. On the other hand, when the current pixel is within the predetermined proximity of the border of the blocks, the control signal (coefficient signal) ranging from 0 to 1.0 is provided to the multiplying units 23 and 27 via the fixed node A and the movable node V.

In the image-data decoding device of FIG. 1 of the present invention, the bit stream (a series of bits) provided to the input node 1 are decoded into the decoded image data by the buffer memory 8, the variable-length decoding unit 9, the inverse-quantization unit 10, the inverse-orthogonal-transformation unit 11, the adder unit 12, and the motion-compensation unit 13 as described above. The decoded image data is stored in the image memory 14, and, then, output.

The image data read from the image memory 14 is provided to the variable-gain-low-pass filter 7, where the block distortion is reduced. Thus, the image data with the suppressed block distortion is output at the output node 2 of the image-data decoding device.

In the image-data decoding device of FIG. 1 of the present invention, a bit stream which is provided to the input node 1 is stored in the buffer memory 8 of the decoder integrated circuit enclosed by the dashed line 3, and, also, is supplied to a buffer memory 4. The bit stream read from the buffer memory 4 of a First-In-First-Out memory is supplied to a quantization-information detecting unit 5. For the quantization-information detecting unit 5, a mechanism similar to that of the variable-length decoding unit 9 may be used.

The quantization-information detecting unit 5 detects the block-quantization-step-size information (e.g., the quantization scale of a macro block QS) for each block, and provides it for the control-signal generating unit 6.

Namely, in the image-data decoding device of FIG. 1, the bit stream provided to the input node 1 is supplied via the buffer memory 4 to the quantization-information detecting unit 5, in which the block-quantization-step-size information is detected from the bit stream for a series of the blocks to be provided to the control-signal generating unit 6. Here, the buffer memory 4, the quantization-information detecting unit 5, the control-signal generating unit 6, and the variable-gain-low-pass filter 7 are provided outside the decoder integrated circuit enclosed by the dashed line 3. Instead, these units can be included in the same integrated circuit.

Figure 7:
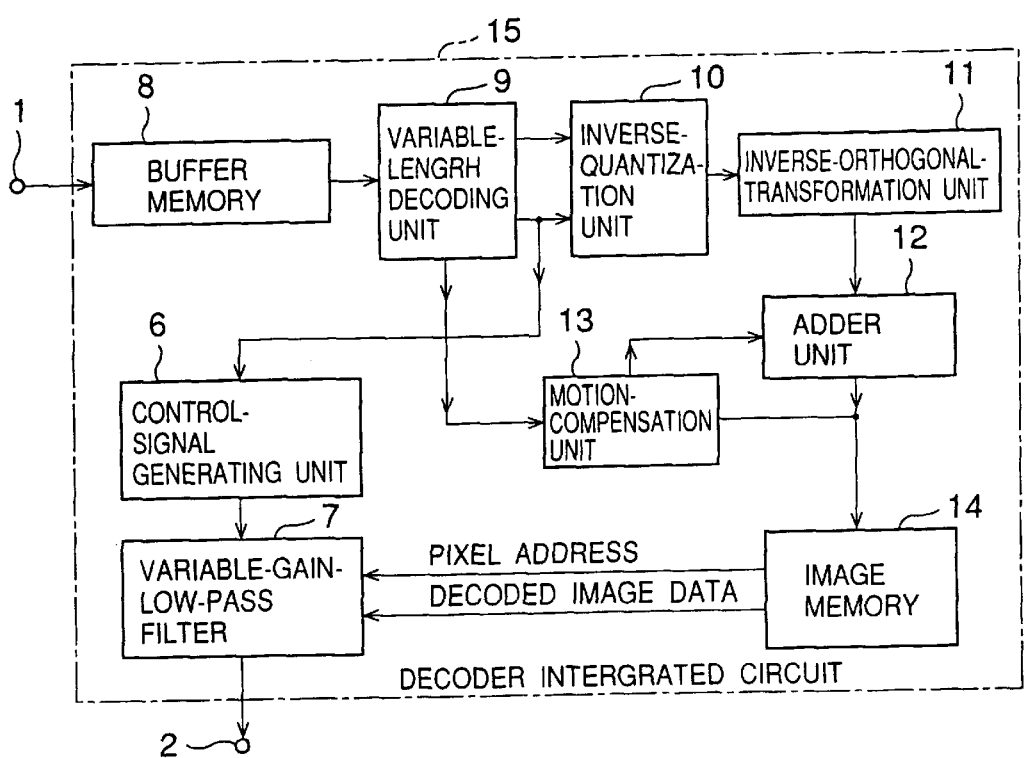
FIG. 7 is a block diagram of an image-data decoding device according to a second embodiment of the present invention.

FIG. 7 is a block diagram of an image-data decoding device according to a second embodiment of the present invention. In FIG. 7, the same elements as those of FIG. 1 are referred to by the same numerals, and a description thereof will be omitted.

In the image-data decoding device of FIG. 7, all units are provided in a decoder integrated circuit enclosed by a dashed line 15. Also, block-quantization-step-size information which is detected from the bit stream for a series of the blocks by the variable-length decoding unit 9 is provided to the control-signal generating unit 6.

In the image-data decoding device of FIG. 7, the operations of the buffer memory 4 and the quantization-information detecting unit 5 of FIG. 1 provided outside the decoder integrated circuit, indicated by the dashed line 3, are carried out by the buffer memory 8 and the variable-length decoding unit 9 provided in the decoder integrated circuit enclosed by the dashed line 15. Also, in FIG. 7, the decoder integrated circuit enclosed by the dashed line 15 includes the control-signal generating unit 6 and the variable-gain-low-pass filter 7. Here, the control-signal generating unit 6 is provided with the block-quantization-step-size information (e.g., the quantization scale of a macro block QS) extracted from the bit stream for a series of the blocks by the variable-length decoding unit 9. Then, the variable-gain-low-pass filter 7 reduces the high-frequency components of the image data provided from the image memory 14 based on the control signal supplied from the control-signal generating unit 6.

In the first and second embodiments of the present invention, the configuration shown in the example of FIG. 5 may be used as the control-signal generating unit 6. Also, the configuration shown in the example of FIG. 2 may be used as the variable-gain-low-pass filter 7. Thus, in the first and second embodiments of the present invention, the variable-gain-low-pass filter 7 adaptively reduces the high-frequency components residing near borders of the blocks according to the block-quantization-step-size information, such that the reduction is stronger as the block-quantization step sizes used in the given block are larger and the differences in the block-quantization step sizes between the given block and the neighboring blocks are greater. As a result, the block distortion in the decoded image data read from the image memory 14 is reduced.

Figure 8:
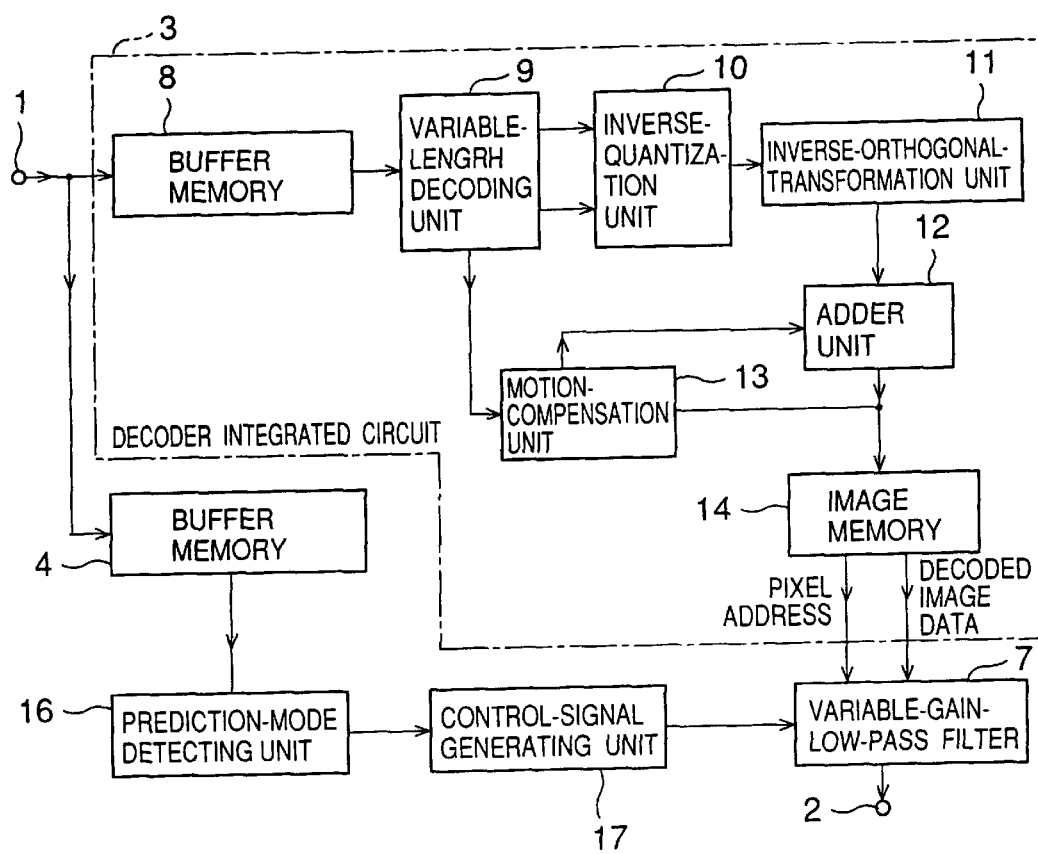
FIG. 8 is a block diagram of an image-data decoding device according to a third embodiment of the present invention.

FIG. 8 is a block diagram of an image-data decoding device according to a third embodiment of the present invention. In FIG. 8, the same elements as those of FIG. 1 are referred to by the same numerals, and a description thereof will be omitted.

In the image-data decoding device of FIG. 8 of the present invention, the bit stream which is to be decoded is applied to the input node 1 to be supplied to the buffer memory 8 of a decoder integrated circuit enclosed by the dashed line 3. Also, the bit stream applied to the input node 1 is provided to the buffer memory 4. The bit stream read from the buffer memory 4 of a First-In-First-Out memory is supplied to a prediction-mode detecting unit 16. For the prediction-mode detecting unit 16, a mechanism similar to that of the variable-length decoding unit 9 may be used.

The prediction-mode detecting unit 16 detects the coding-mode information (an intra-frame coding mode or an inter-frame coding mode) from the bit stream for each successive block, and provides it to a control-signal generating unit 17.

Figure 9:
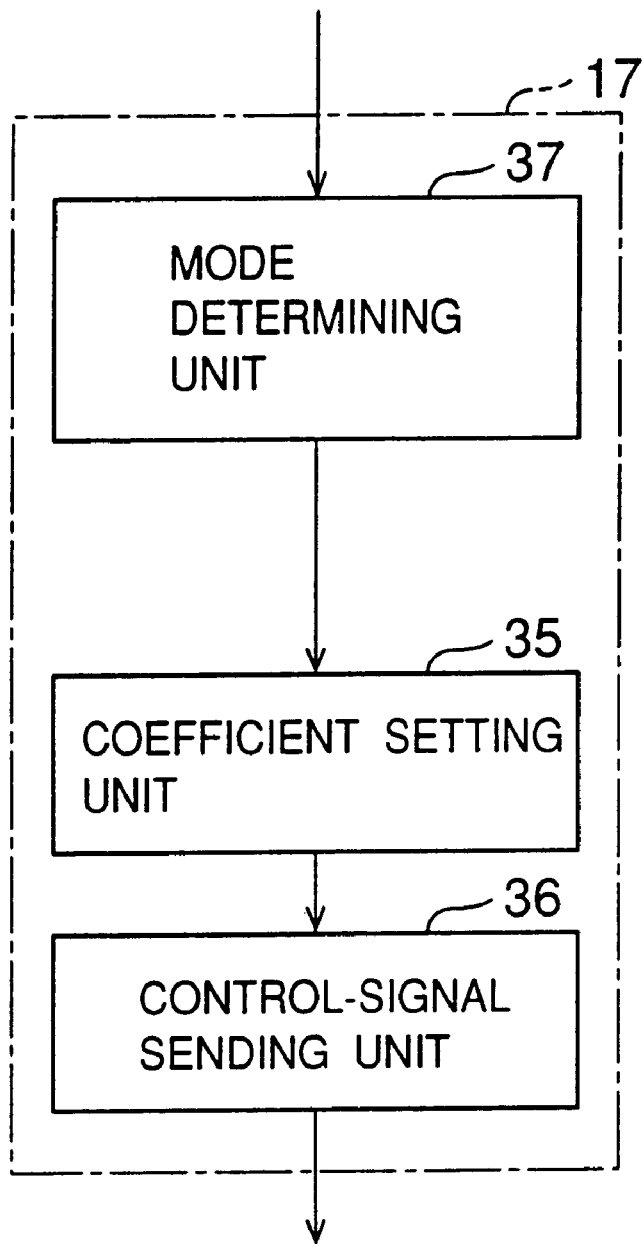
FIG. 9 is a block diagram of a control-signal generating unit of FIG. 8.

FIG. 9 is a block diagram of the control-signal generating unit 17 of FIG. 8 which generates the coefficient signal ranging from 0 to 1 and provides it to the variable-gain-low-pass filter 7. The control-signal generating unit 17 includes a mode determining unit 37, the coefficient setting unit 35, and the control-signal sending unit 36.

In the control-signal generating unit 17 shown in FIG. 9, the mode determining unit 37 determines, based on the coding-mode information, whether intra-coding was used for a given block. Then, the mode determining unit 37 supplies a signal indicative of intra-coding (or no intra-coding) to the coefficient setting unit 35. The coefficient setting unit 35 receives the signal as an address of a ROM table, which generates the control signal corresponding to a predetermined coefficient. The control signal is supplied to the variable-gain-low-pass filter 7 via the control-signal sending unit 36. In detail, the control signal supplied to the variable-gain-low-pass filter 7 is applied to the fixed node A of the switch 30 thereof (shown in FIG. 2). The operation of the variable-gain-low-pass filter 7 is the same as described before.

In the image-data decoding device of FIG. 8, the bit stream provided to the input node 1 is supplied via the buffer memory 4 to the prediction-mode detecting unit 16, in which the coding-mode information is detected from the bit stream for a series of the blocks to be provided to the control-signal generating unit 17. Here, the buffer memory 4, the prediction-mode detecting unit 16, the control-signal generating unit 17, and the variable-gain-low-pass filter 7 are provided outside the decoder integrated circuit enclosed by the dashed line 3. In the alternative, these units can be included in the same integrated circuit.

Figure 10:
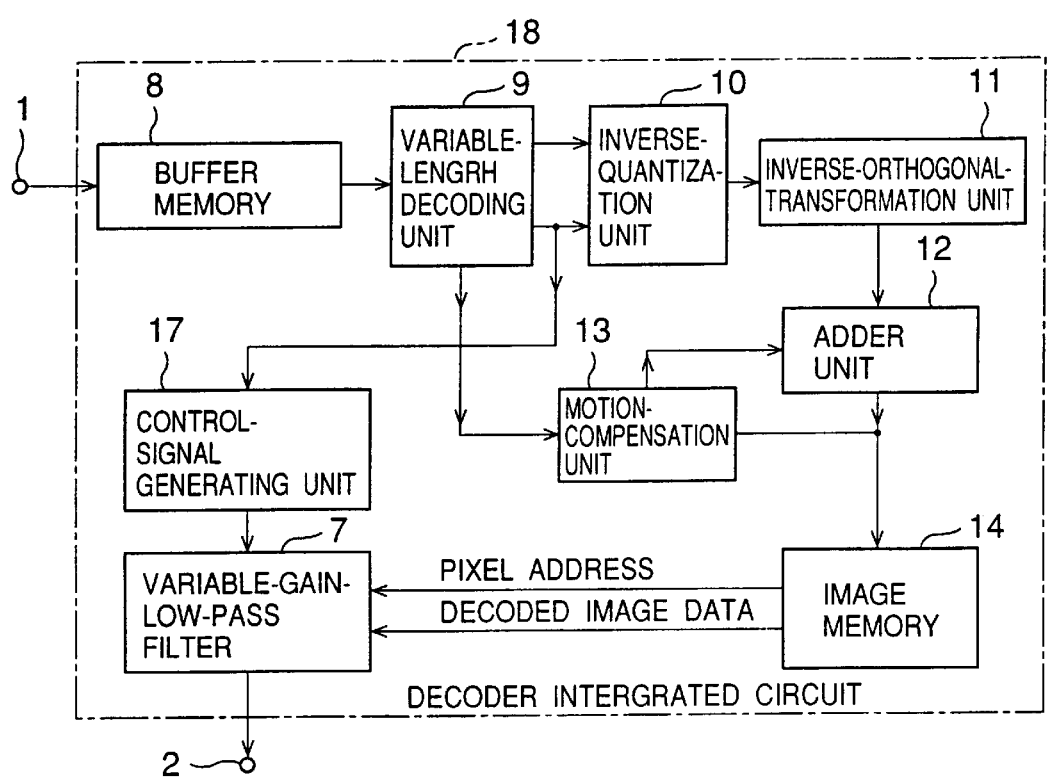
FIG. 10 is a block diagram of an image-data decoding device according to a fourth embodiment of the present invention.

FIG. 10 is a block diagram of an image-data decoding device according to a fourth embodiment of the present invention. In FIG. 10, the same elements as those of FIG. 8 are referred to by the same numerals, and a description thereof will be omitted. In the image-data decoding device of FIG. 10, all units are provided in a decoder integrated circuit enclosed by a dashed line 18. Also, the coding-mode information which is detected from the bit stream for each successive block by the variable-length decoding unit 9 is provided to the control-signal generating unit 17.

In the third and fourth embodiments of the present invention, a configuration shown in the example of FIG. 9 may be used as the control-signal generating unit 17. Also, a configuration shown in the example of FIG. 2 may be used as the variable-gain-low-pass filter 7. Thus, in the third and fourth embodiments of the present invention, the variable-gain-low-pass filter 7 adaptively reduces the high-frequency components residing near the borders of a block according to the coding-mode information, such that the reduction is made for an intra-coding block but not for a non-intra-coding block. As a result, the block distortion in the decoded image data read from the image memory 14 is reduced.

The reason why the high-frequency components near the borders of an intra-coding block should be reduced is because the block distortion is conspicuous in an intra-coding block when it is located among non-intra-coding blocks. In order to reduce the high-frequency components near the borders of a given block when the given block is coded through intra coding, the coefficient setting unit 35 of the control-signal generating unit 17 may generate a coefficient of 0.5 for an intra-coding block and generate a coefficient of 1.0 for a non-intra-coding block. A configuration of the coefficient setting unit 35 for implementing this function may use the ROM table as described above which receive the signal from the mode determining unit 37 as an address thereof. Alternatively, the coefficient setting unit 35 may use a switch for switching an output thereof between the coefficient of 0.5 and the coefficient of 1.0 according to the signal provided from the mode determining unit 37.

Instead of using the coefficient of 1.0 for the non-intra-coding block, a coefficient less than 1.0 but greater than the coefficient for the intra-coding block may be used.

Figure 11:
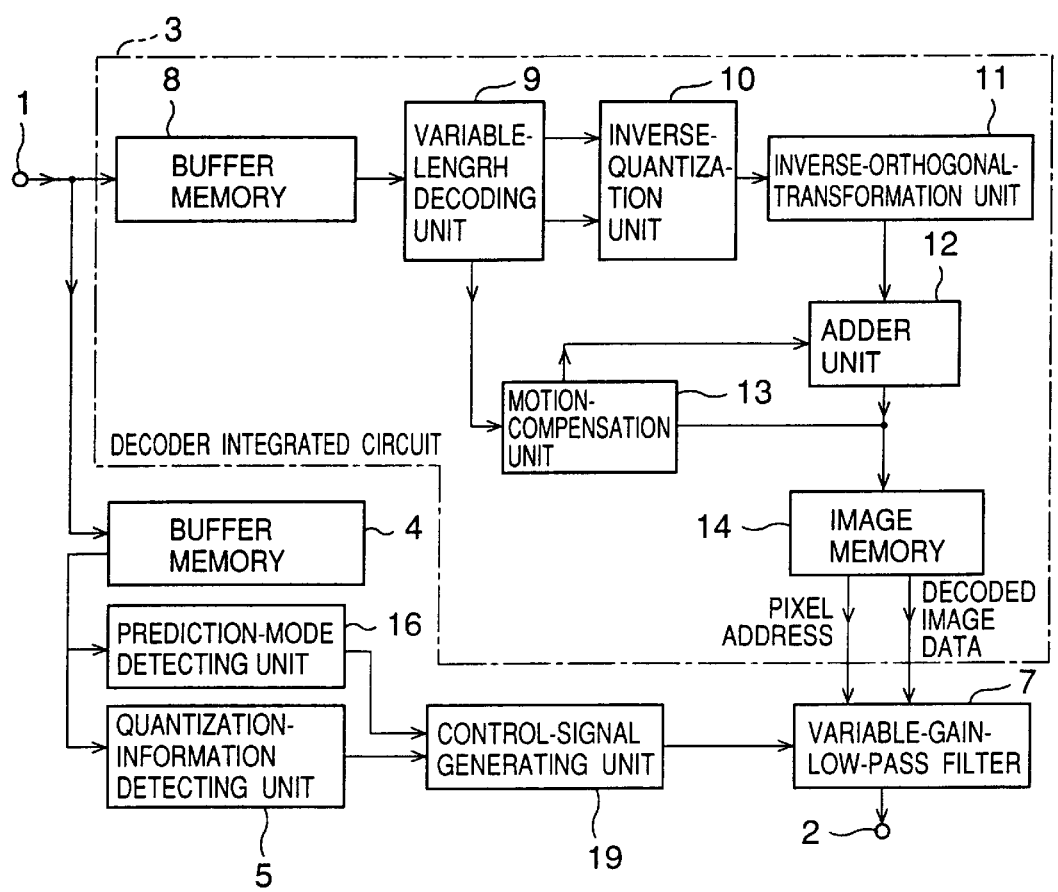
FIG. 11 is a block diagram of an image-data decoding device according to a fifth embodiment of the present invention.

FIG. 11 is a block diagram of an image-data decoding device according to a fifth embodiment of the present invention. In FIG. 11, the same elements as those of FIG. 1 and FIG. 8 are referred to by the same numerals, and a description thereof will be omitted.

In the image-data decoding device of FIG. 11 of the present invention, the bit stream which is to be decoded is applied to the input node 1 to be supplied to the buffer memory 8 of a decoder integrated circuit enclosed by the dashed line 3. Also, the bit stream applied to the input node 1 is provided to the buffer memory 4. The bit stream read from the buffer memory 4 of a First-In-First-Out memory is supplied to the quantization-information detecting unit 5 and the prediction-mode detecting unit 16. For the quantization-information detecting unit 5 and the prediction-mode detecting unit 16, a mechanism similar to that of the variable-length decoding unit 9 may be used.

The quantization-information detecting unit 5 detects the block-quantization-step-size information (e.g., the quantization scale of a macro block QS) for each successive block, and provides it for a control-signal generating unit 19. Further, the prediction-mode detecting unit 16 detects the coding-mode information (an intra-frame coding mode or inter-frame coding mode) from the bit stream for each successive block, and provides it to the control-signal generating unit 19.

Figure 12:
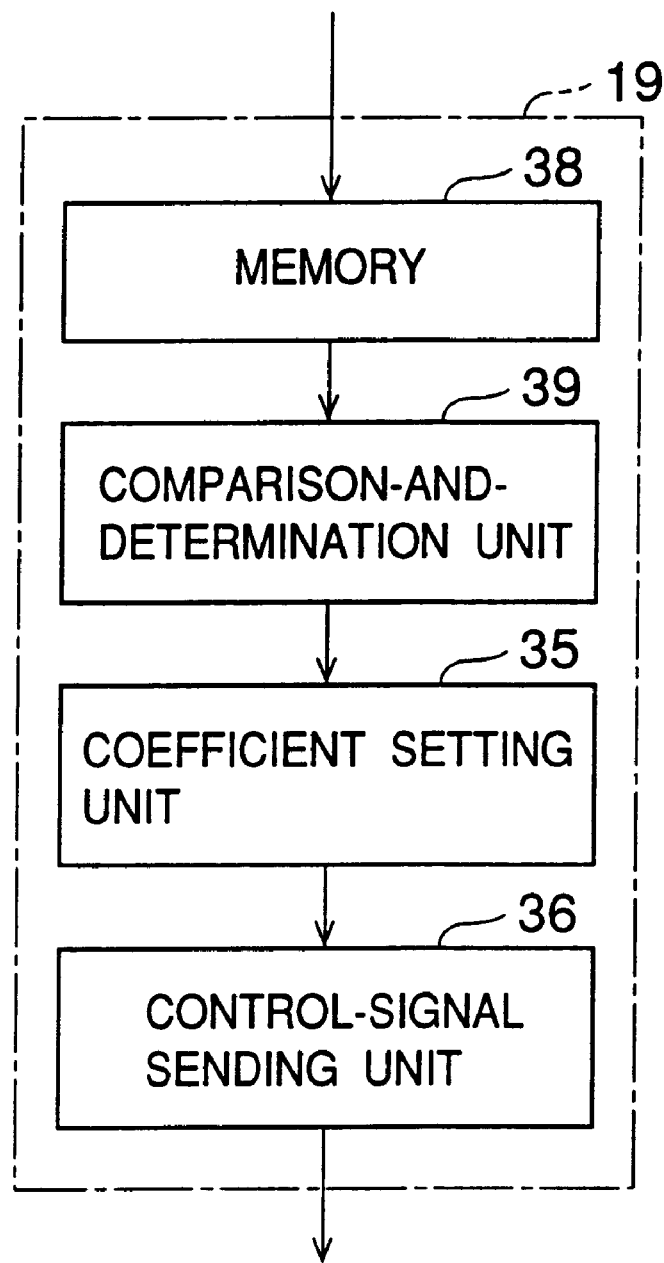
FIG. 12 is a block diagram of a control-signal generating unit of FIG. 11.

FIG. 12 is a block diagram of the control-signal generating unit 19 of FIG. 11 which generates the coefficient signal ranging from 0 to 1 and provides it to the variable-gain-low-pass filter 7. The control-signal generating unit 19 includes a memory 38, a comparison-and-determination unit 39, the coefficient setting unit 35, and the control-signal sending unit 36.

In the control-signal generating unit 19 shown in FIG. 12, the memory 38 has more than enough capacity to store the block-quantization-step-size information and the coding-mode information necessary for conducting relevant signal processing (e.g., at least 3 lines of an image). The memory 38 stores the block-quantization-step-size information and the coding-mode information in a sequence for each successive block. The block-quantization-step-size information and the coding-mode information read from the memory 38 are supplied to the comparison-and-determination unit 39.

The comparison-and-determination unit 39 carries out the same operations as those of the comparison unit 34 of FIG. 5 and the mode determining unit 37 of FIG. 9 to generate an output signal. This output signal is supplied as an address to the ROM table of the coefficient setting unit 35. The ROM table generates the control signal corresponding to a predetermined coefficient, which signal is supplied to the variable-gain-low-pass filter 7 via the control-signal sending unit 36. In detail, the control signal supplied to the variable-gain-low-pass filter 7 is applied to the fixed node A of the switch 30 thereof (shown in FIG. 2). The operation of the variable-gain-low-pass filter 7 is the same as described before.

In the image-data decoding device of FIG. 11, the bit stream provided to the input node 1 is supplied via the buffer memory 4 to the quantization-information detecting unit 5 and to the prediction-mode detecting unit 16, so that the block-quantization-step-size information and the coding-mode information are detected from the bit stream for each successive block, and are provided to the control-signal generating unit 19. Here, the buffer memory 4, the quantization-information detecting unit 5, the prediction-mode detecting unit 16, the control-signal generating unit 19, and the variable-gain-low-pass filter 7 are provided outside the decoder integrated circuit enclosed by the dashed line 3. Instead, these units can be included in the same integrated circuit.

Figure 13:
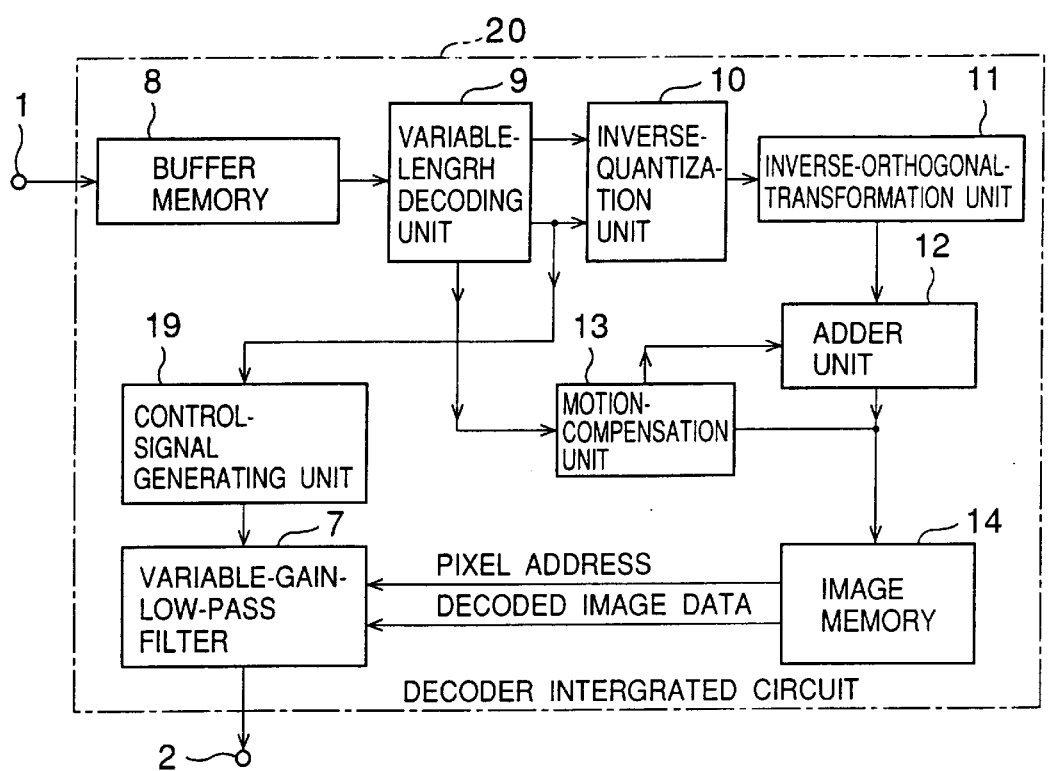
FIG. 13 is a block diagram of an image-data decoding device according to a sixth embodiment of the present invention.

FIG. 13 is a block diagram of an image-data decoding device according to a sixth embodiment of the present invention. In FIG. 13, the same elements as those of FIG. 11 are referred to by the same numerals, and a description thereof will be omitted. In the image-data decoding device of FIG. 13, all units are provided in a decoder integrated circuit enclosed by a dashed line 20. Also, the coding-mode information which is detected from the bit stream for each successive block by the variable-length decoding unit 9 is provided to the control-signal generating unit 19.

In the fifth and sixth embodiments of the present invention, a configuration shown in the example of FIG. 12 may be used as the control-signal generating unit 19. Also, a configuration shown in the example of FIG. 2 may be used as the variable-gain-low-pass filter 7. In the fifth and sixth embodiments of the present invention, the variable-gain-low-pass filter 7 adaptively reduces the high-frequency components located near the borders of a block according to the block-quantization-step-size information and the coding-mode information, such that the reduction is made for an intra-coding block but not for a non-intra-coding block and such that the reduction is stronger as the block-quantization step sizes used in a given block are larger and the differences in the block-quantization step sizes between the given block and the neighboring blocks are greater. As a result, the block distortion in the decoded image data read from the image memory 14 is reduced.

As described above, according to the first through sixth embodiments of the present invention, at least one of the block-quantization-step-size information and the coding-mode information is used for reducing the block distortion appearing near the borders of a given block. When the block-quantization-step-size information alone is used, the reduction of the block distortion is stronger as the block-quantization step sizes used in the given block are larger and the differences in the block-quantization step sizes between the given block and the neighboring blocks are greater. When the coding-mode information alone is used, the reduction of the block distortion is made for an intra-coding block but not for a non-intra-coding block. When both the block-quantization-step-size information and the coding-mode information are used, the reduction is made for an intra-coding block but not for a non-intra-coding block such that the reduction is stronger as the block-quantization step sizes used in a given block are larger and the differences in the block-quantization step sizes between the given block and the neighboring blocks are greater.

Figure 14:
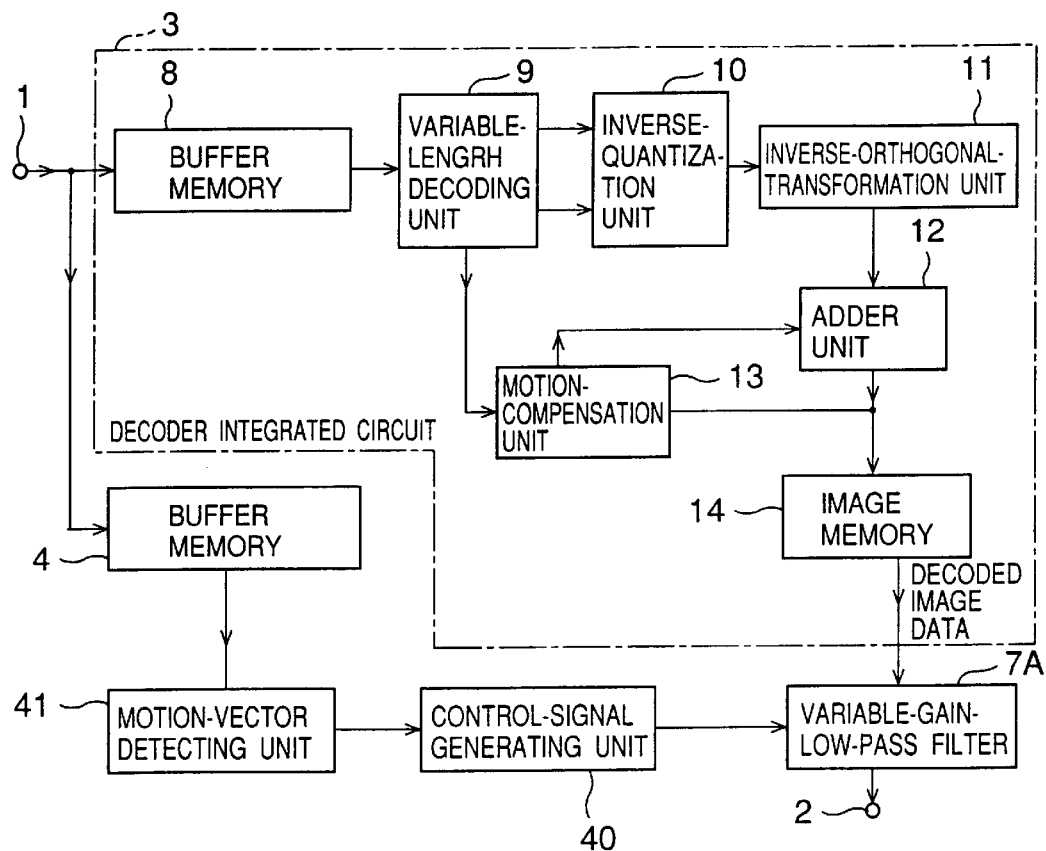
FIG. 14 is a block diagram of an image-data decoding device according to a seventh embodiment of the present invention.

FIG. 14 is a block diagram of an image-data decoding device according to a seventh embodiment of the present invention. In FIG. 14, the same elements as those of FIG. 1 are referred to by the same numerals, and a description thereof will be omitted.

Figure 15:
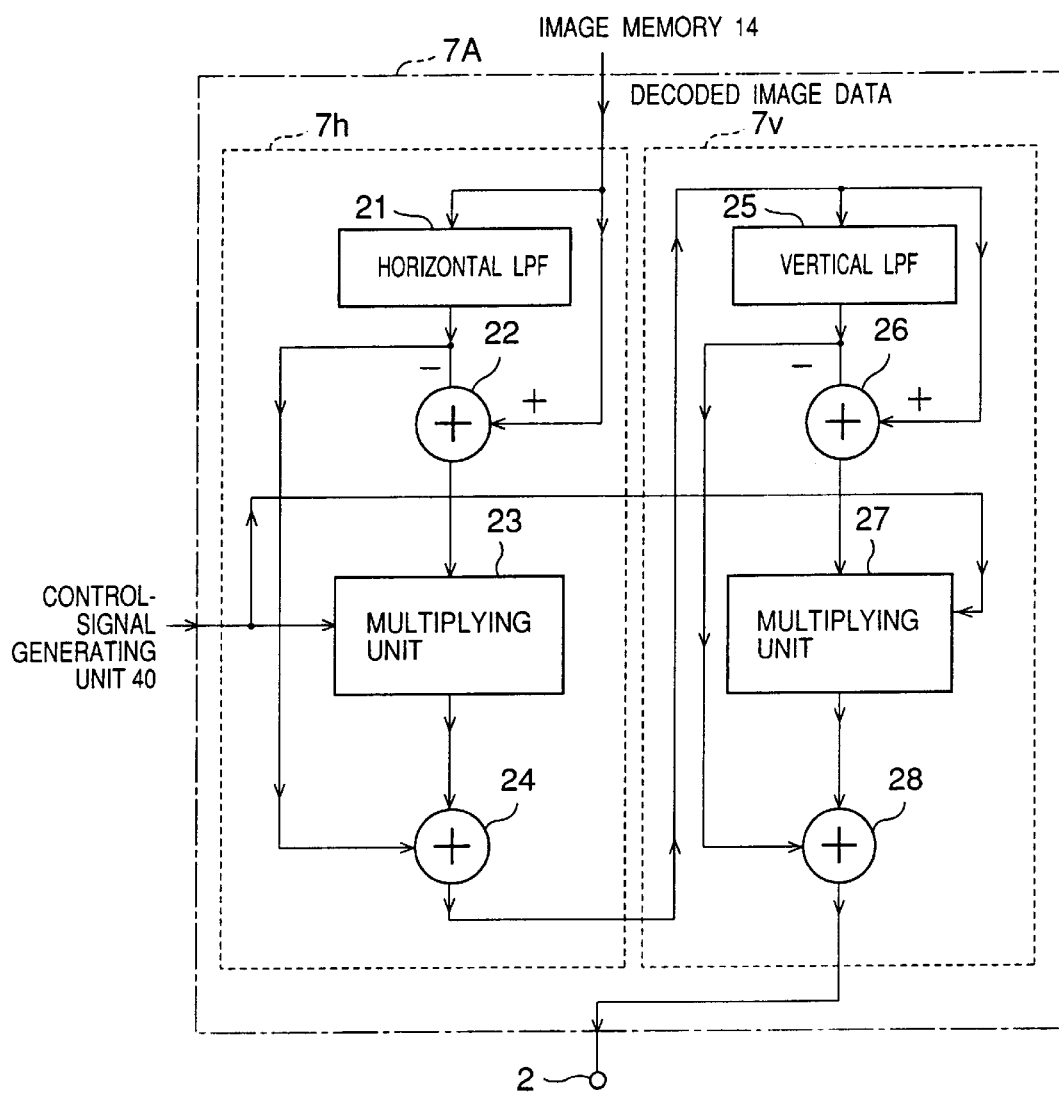
FIG. 15 is a block diagram of a variable-gain-low-pass filter of FIG. 14.

In the image-data decoding device of FIG. 14, the image data provided from the image memory 14 is output at an output node 2 via a variable-gain-low-pass filter 7A. The variable-gain-low-pass filter 7A is controlled by a control signal provided from a control-signal generating unit 40 to reduce a signal level of high frequency components of the image. FIG. 15 is a block diagram of the variable-gain-low-pass filter 7A. In FIG. 15, a portion enclosed by a dotted line 7h serves to reduce high frequency components in a horizontal direction of the image. Also, a portion enclosed by a dotted line 7v serves to reduce high frequency components in a vertical direction of the image.

The portion enclosed by the dotted line 7h and the portion enclosed by the dotted line 7v are connected in series. Thus, both portions form a variable-gain-low-pass filter for two-dimensionally reducing high frequency components of the decoded image.

In FIG. 15, the portion enclosed by the dotted line 7h includes the horizontal LPF 21 having a predetermined cut-off frequency, the subtracting unit 22, the multiplying unit 23, and the adder unit 24. Also, the portion enclosed by the dotted line 7v includes the vertical LPF 25 having a predetermined cut-off frequency, the subtracting unit 26, the multiplying unit 27, and the adder unit 28.

Instead of the configuration shown in FIG. 15, the variable-gain-low-pass filter 7A may include only one two-dimensional LPF, one multiplying unit, and one adder. The variable-gain-low-pass; filter 7A having the latter configuration can function in the same manner as the variable-gain-low-pass filter 7A of FIG. 15.

In FIG. 15, the multiplying unit 23 in the portion enclosed by the dotted line 7h and the multiplying unit 27 in the portion enclosed by the dotted line 7v are provided with the control signal from the control-signal generating unit 40. Then, each of the multiplying unit 23 and the multiplying unit 27 multiplies signal components in a frequency band higher than the predetermined cut-off frequency of a corresponding LPF by a coefficient ranging from 0 to 1.0.

In the variable-gain-low-pass filter 7A, the control signal provided from the control-signal generating unit 40 is used for reducing the high-frequency components of the decoded image data according to a motion vector value in a given block and differences in motion vector values between the given block and neighboring blocks. Here, the motion vector value is detected by a motion-vector detecting unit 41, and is defined for each macro block including at least one unit block to which the DCT is applied.

In general, when there is a coherent movement in the entire image, there may not be much quantization noise due to the movement itself. However, the quantization noise (both the mosquito noise and the block distortion) in a given block tends to become large when motion in a picture is locally present in the given block. In other words, the quantization noise in the given block may be larger as the motion vector of the given block becomes greater, and, also, the quantization noise in the given block is larger as a difference between the motion vector of the given block and the motion vectors of surrounding blocks becomes greater.

Figures 16, 17:
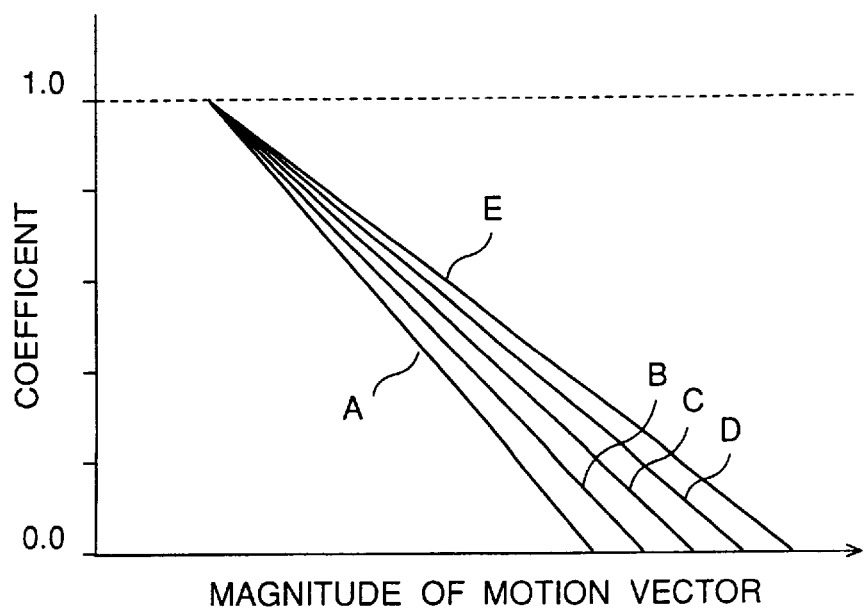
FIG. 16 is an illustrative drawing for explaining a motion vector defined for each macro block, for which a quantization scale is also defined.
FIG. 17 is a chart showing a relation between a motion vector value and a multiplication coefficient ranging from 0.0 to 1.0.

FIG. 16 is an illustrative drawing for explaining the motion vectors defined for each macro block, for which the quantization scale is also defined as described before. In FIG. 16, MV0 through MV8 represent the motion vector values defined for each macro block. A magnitude of a motion vector MVi (i=0, 1, . . . , 8) is represented as:

$$MVi = MVi(x)^2 + MVi(y)^2 \quad (3)$$

In FIG. 16, the block whose motion vector value is represented as MV0 is regarded as a current block. A motion vector differential dMV which is a difference in the motion vectors between the current block and the eight neighboring blocks (having the motion vector values MV1 through MV8) is represented as:

$$dMV = \{MV1(x) - MV0(x)\}^2 + \{MV2(x) - MV0(x)\}^2 \quad (4)$$
$$+ \{MV3(x) - MV0(x)\}^2 + \{MV4(x) - MV0(x)\}^2$$
$$+ \{MV5(x) - MV0(x)\}^2 + \{MV6(x) - MV0(x)\}^2$$
$$+ \{MV7(x) - MV0(x)\}^2 + \{MV8(x) - MV0(x)\}^2$$
$$+ \{MV1(y) - MV0(y)\}^2 + \{MV2(y) - MV0(y)\}^2$$
$$+ \{MV3(y) - MV0(y)\}^2 + \{MV4(y) - MV0(y)\}^2$$
$$+ \{MV5(y) - MV0(y)\}^2 + \{MV6(y) - MV0(y)\}^2$$
$$+ \{MV7(y) - MV0(y)\}^2 + \{MV8(y) - MV0(y)\}^2$$

wherein a motion vector of a given block is expressed by using the x coordinate and the y coordinate as (MVi(x), MVi(y)) (i=0, 1, . . . , 8).

Both the motion vector value MVi (MV0 for the current block in FIG. 16 ) and the motion vector differential dMV are standardized to range between 0.0 and 1.0. FIG. 17 is a chart showing a relation between the motion vector value MV0 and the multiplication coefficient ranging from 0.0 to 1.0 supplied from the control-signal generating unit 40 to the variable-gain-low-pass filter 7A. Here, the abscissa coordinate may be a sum of the motion vector value MV0 and the motion vector differential dMV, instead of the motion vector value MV0.

FIG. 17 shows characteristic lines A through E which are used for adaptively reducing the high-frequency components according to the motion vector value MV0 or the sum of the motion vector value MV0 and the motion vector differential dMV. For example, the characteristic line A is used when the motion vector differential dMV is greater than or equal to 50, the characteristic line B is used when the motion vector differential dMV is greater than or equal to 40 and less than 50, the characteristic line C is used when the motion vector differential dMV is greater than or equal to 30 and less than 40, the characteristic line D is used when the motion vector differential dMV is greater than or equal to 20 and less than 30, and the characteristic line E is used when the motion vector differential dMV is less than 20. In this manner, the control characteristic may be adaptively modified by using the characteristic lines A through E.

Figure 18:
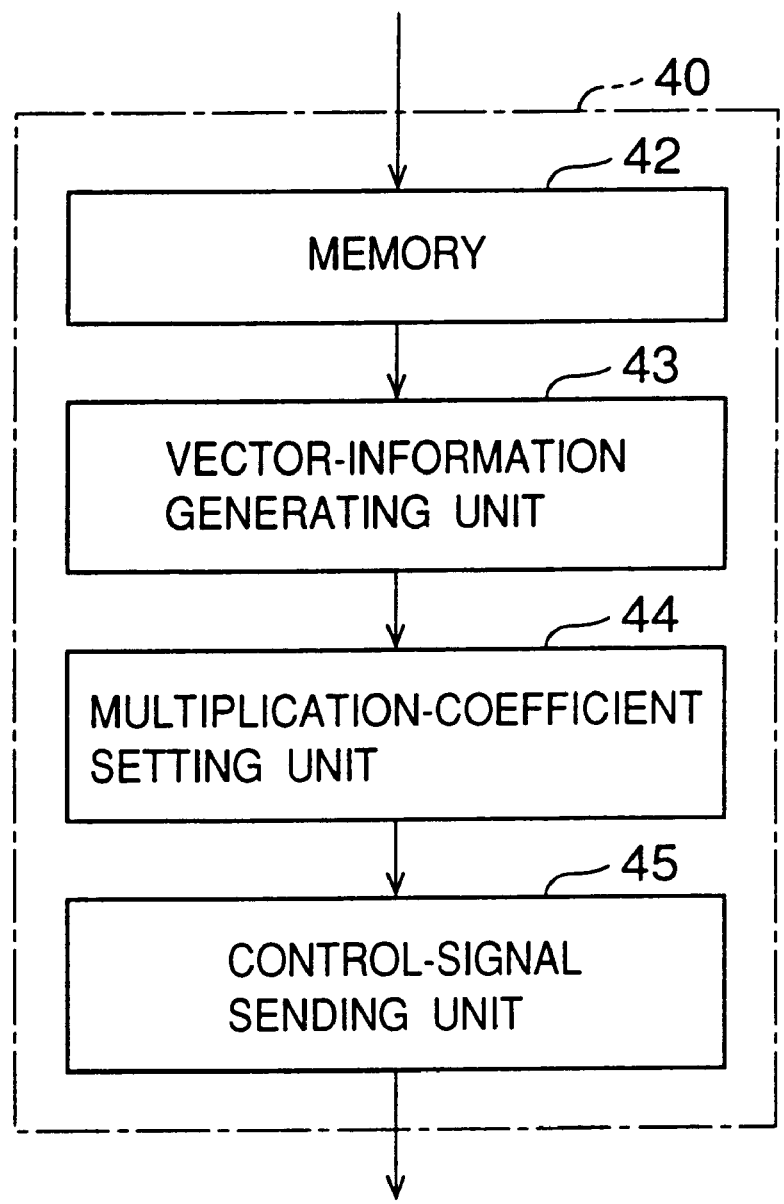
FIG. 18 is a block diagram of a control-signal generating unit of FIG. 14.

FIG. 18 is a block diagram of the control-signal generating unit 40 of FIG. 14 which supplies the coefficient signal ranging from 0.0 to 1.0 to the variable-gain-low-pass filter 7A. In FIG. 18, the control-signal generating unit 40 includes a memory 42, a vector-information generating unit 43, a multiplication-coefficient setting unit 44, and a control-signal sending unit 45. The memory 42 has more than sufficient capacity to store the motion-vector information necessary for conducting relevant signal processing (e.g., at least 3 lines of an image).

The motion-vector information read out from the memory 42 is supplied to the vector-information generating unit 43, where MV0 of the equation (3) is calculated, or the sum of MV0 of the equation (3) and the dMV of the equation (4) is calculated. Then, the vector-information generating unit 43 supplies the calculation result to the multiplication-coefficient setting unit 44.

The multiplication-coefficient setting unit 44 receives the motion vector value MV0 (or the sum of the motion vector value MV0 and the motion vector differential dMV) as an address of a ROM table, which outputs the control signal corresponding to a certain multiplication coefficient by using a relation as shown in the example of FIG. 17. The control signal is supplied to the variable-gain-low-pass filter 7A via the control-signal sending unit 45.

As described above, the ROM table of the control-signal generating unit 40 receives the motion vector value MV0 or the sum of the motion vector value MV0 and the motion vector differential dMV. Alternatively, the ROM table may receive the motion vector differential dMV alone, receive the motion vector value MV0 and an address of a current pixel, or receive the motion vector differential dMV and an address of the current pixel.

A filtering operation of the variable-gain-low-pass filter 7A which reduces the high-frequency components adaptively according to the motion vector information is the same as that of the first embodiment explained with reference to FIG. 6. Thus, a description of the filtering operation will be omitted for the seventh embodiment.

In the image-data decoding device of FIG. 14 according to the seventh embodiment of the present invention, the bit stream (a series of bits) provided to the input node 1 are decoded into the decoded image data by the buffer memory 8, the variable-length decoding unit 9, the inverse-quantization unit 10, the inverse-orthogonal-transformation unit 11, the adder unit 12, and the motion-compensation unit 13 as described above. The decoded image data is stored in the image memory 14, and, then, output.

The image data read from the image memory 14 is provided to the variable-gain-low-pass filter 7A, where the quantization noise is reduced. Thus, the image data with the suppressed quantization noise is output at the output node 2 of the image-data decoding device.

In the image-data decoding device of FIG. 14 of the seventh embodiment, a bit stream which is provided to the input node 1 is stored in the buffer memory 8 of the decoder integrated circuit enclosed by the dashed line 3, and, also, is supplied to the buffer memory 4. The bit stream read from the buffer memory 4 of a First-In-First-Out memory is supplied to the motion-vector detecting unit 41. For the motion-vector detecting unit 41, a mechanism similar to that of the variable-length decoding unit 9 may be used.

The motion-vector detecting unit 41 detects the motion-vector information from the bit stream for each successive block, and provides it for the control-signal generating unit 40.

Namely, in the image-data decoding device of FIG. 14, the bit stream provided to the input node 1 is supplied via the buffer memory 4 to the motion-vector detecting unit 41, in which the motion-vector information is detected from the bit stream for each successive block to be provided to the control-signal generating unit 40. Here, the buffer memory 4, the motion-vector detecting unit 41, the control-signal generating unit 40, and the variable-gain-low-pass filter 7A are provided outside the decoder integrated circuit enclosed by the dashed line 3. Alternatively, these units can be included in the same integrated circuit.

Figure 19:
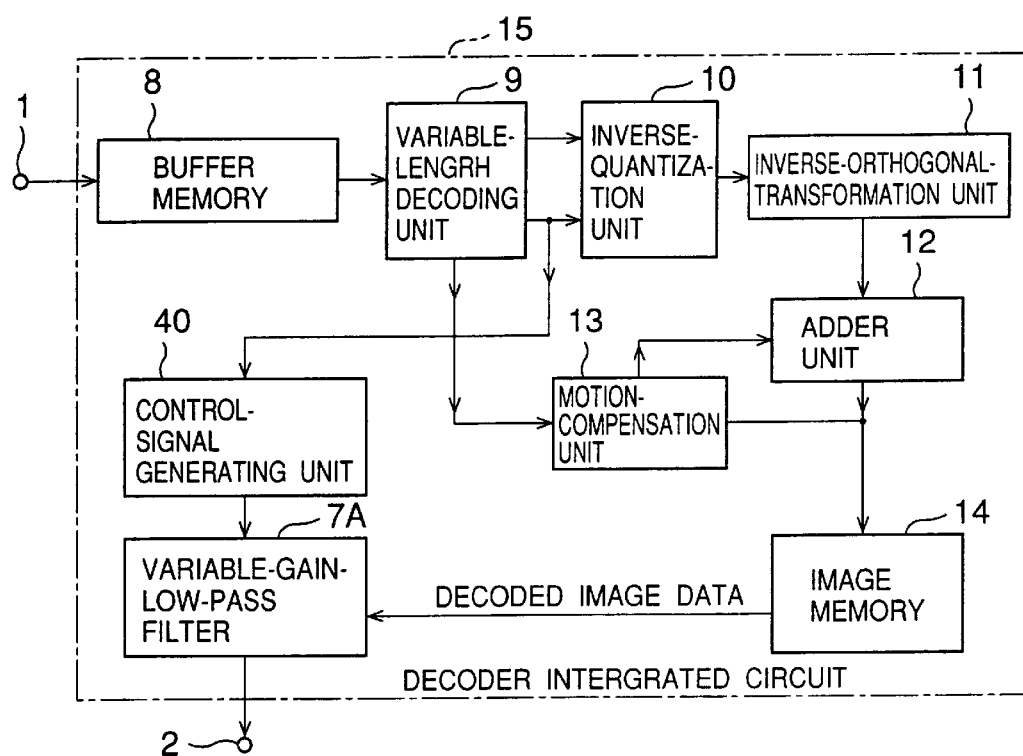
FIG. 19 is a block diagram of an image-data decoding device according to an eighth embodiment of the present invention.

FIG. 19 is a block diagram of an image-data decoding device according to an eighth embodiment of the present invention. In FIG. 19, the same elements as those of FIG. 14 are referred to by the same numerals, and a description thereof will be omitted.

In the image-data decoding device of FIG. 19, all units are provided in a decoder integrated circuit enclosed by the dashed line 15. Also, the motion-vector information which is detected from the bit stream for each successive block by the variable-length decoding unit 9 is provided to the control-signal generating unit 40.

Namely, in the image-data decoding device of FIG. 19, the operations of the buffer memory 4 and the motion-vector detecting unit 41 of FIG. 14 provided outside the decoder integrated circuit indicated by the dashed line 3 are carried out by the buffer memory 8 and the variable-length decoding unit 9 provided in the decoder integrated circuit enclosed by the dashed line 15. Also, in FIG. 19, the decoder integrated circuit enclosed by the dashed line 15 includes the control-signal generating unit 40 and the variable-gain-low-pass filter 7A. Here, the control-signal generating unit 40 is provided with the motion-vector information extracted from the bit stream for each successive block by the variable-length decoding unit 9. Then, the variable-gain-low-pass filter 7A change the high-frequency components of the image data provided from the image memory 14 based on the control signal supplied from the control-signal generating unit 40.

In the seventh and eighth embodiments of the present invention, a configuration shown in the example of FIG. 18 may be used as the control-signal generating unit 40. Also, a configuration shown in the example of FIG. 15 may be used as the variable-gain-low-pass filter 7A. Thus, in the seventh and eighth embodiments of the present invention, the variable-gain-low-pass filter 7A adaptively reduces the high-frequency components according to the control signal supplied from the control-signal generating unit 40, i.e., according to the motion vector value MV0 and/or the motion vector differential dMV extracted from the bit stream. As a result, the quantization noise caused by motion in a picture is reduced.

As described above, according to the seventh and eight embodiment of the present invention, the high-frequency components are reduced adaptively according to the magnitudes of the motion vectors detected in the decoding process, so that a reduction of the high-frequency components is only applied to an image area suffering from the quantization noise caused by picture motion. In addition, the high-frequency components are reduced adaptively according to the motion vector differential, so that a reduction of the high-frequency components is applied to an image area suffering from the quantization noise caused by locally occurring picture motion.

Therefore, the quantization noise is reduced in accordance with motion in the decoded image and the degree of image degradation. When coherent movement in the entire image is present, the motion compensation is likely to be effective so that the quantization noise tends to be small. Also, it is human visual characteristics to be able to achieve a higher resolution in visual perception when the entire picture is coherently moving in a one direction than when pictures of different blocks are moving in different directions. The quantization-noise reduction according to the seventh and eighth embodiments of the present invention copes with these characteristics of the motion compensation and the human visual perception.

Figure 20:
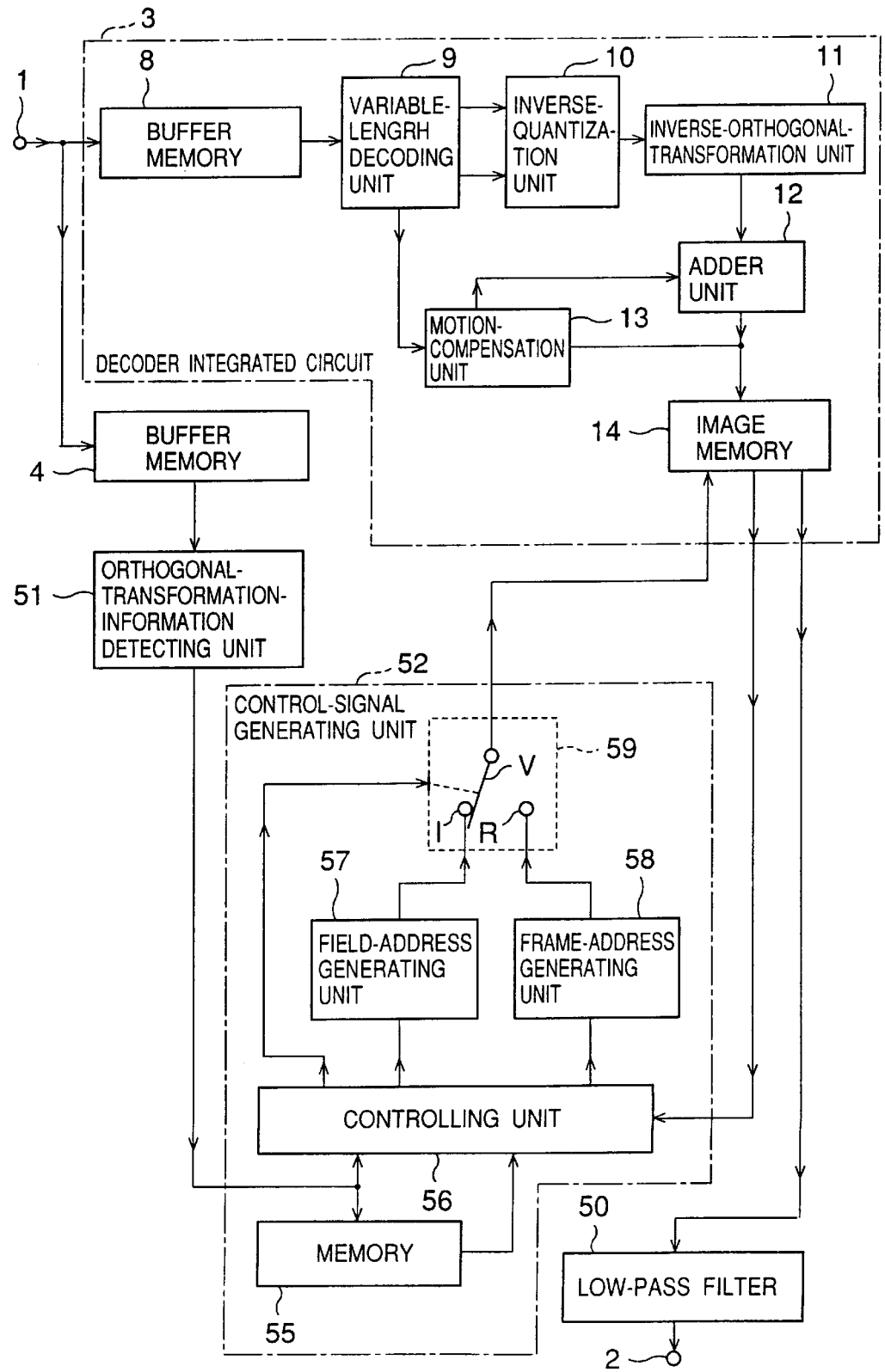
FIG. 20 is a block diagram of an image-decoding device according to a ninth embodiment of the present invention.

FIG. 20 is a block diagram of an image-decoding device according to a ninth embodiment of the present invention. In FIG. 20, the same elements as those of FIG. 1 are referred to by the same numerals, and a description thereof will be omitted.

In order to facilitate the understanding of the ninth embodiment of the present invention, a picture structure of moving-picture image data will be described below before providing a description of the image decoding device of FIG. 20.

In MPEG1, the highly efficient coding of the moving picture is carried out on the image data having a frame structure. On the other hand, the highly efficient coding of the moving picture in MPEG2 is carried out either on the image data having a frame structure using one frame as a unit for coding or on the image data having a field structure using one field as a unit for coding.

Figure 21A:
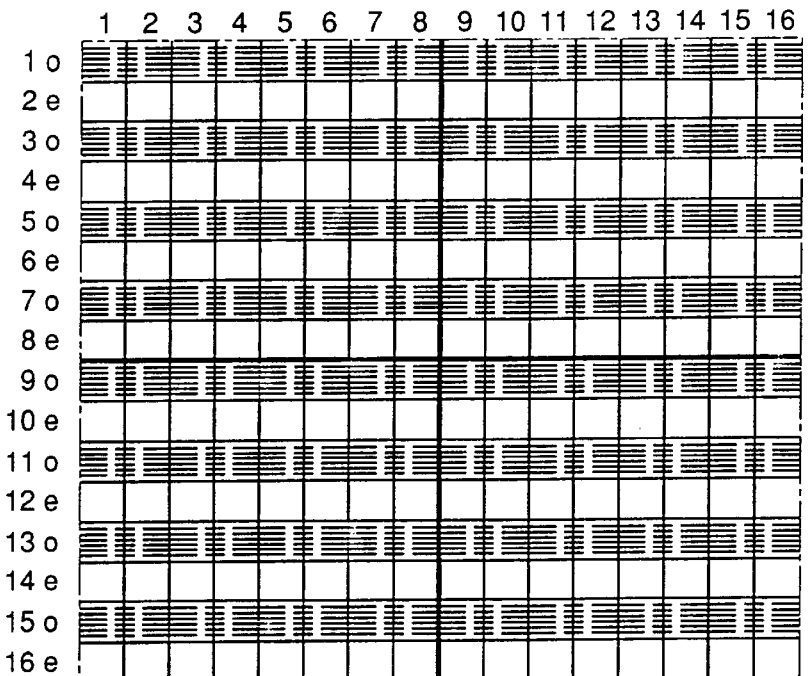
FIGS. 21A though 21E are illustrative drawing showing a macro block and unit blocks of a frame structure.
Figure 21B:
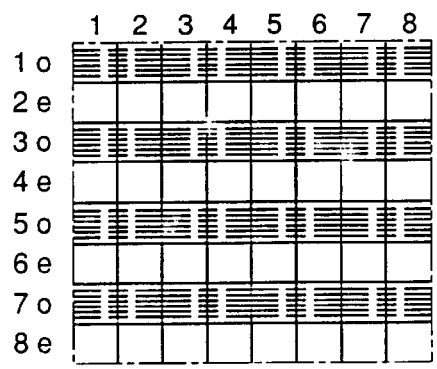
Figure 21C:
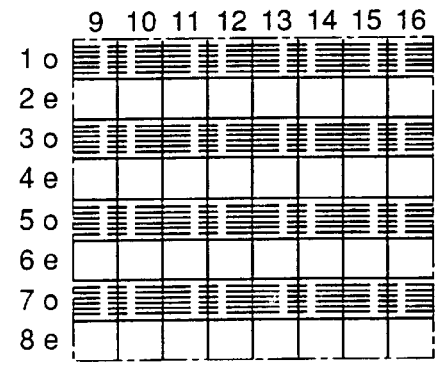
Figure 21D:
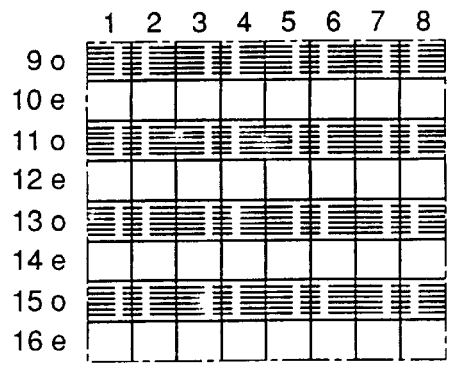
Figure 21E:
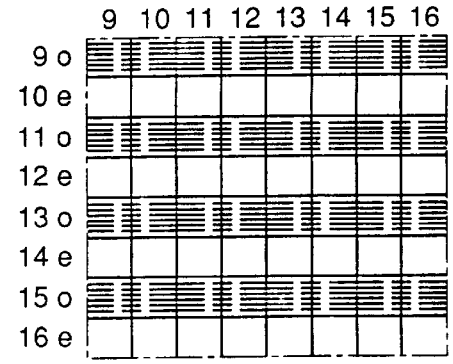
Figure 22A:
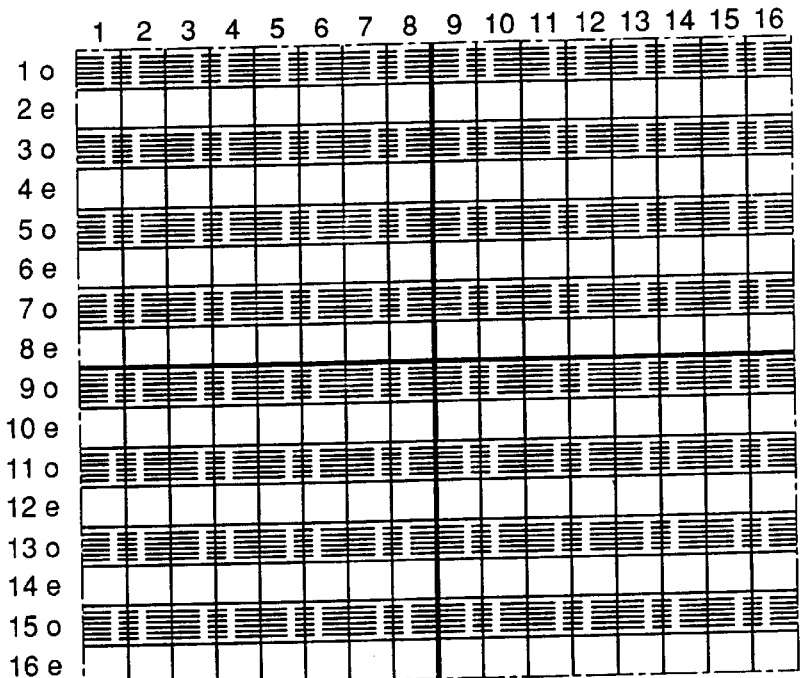
FIGS. 22A through 22E are illustrative drawing showing a macro block and unit blocks of a field structure.
Figure 22B:
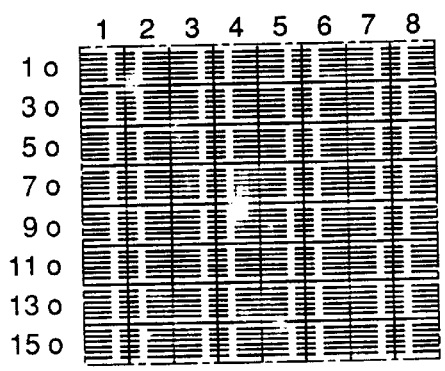
Figure 22C:
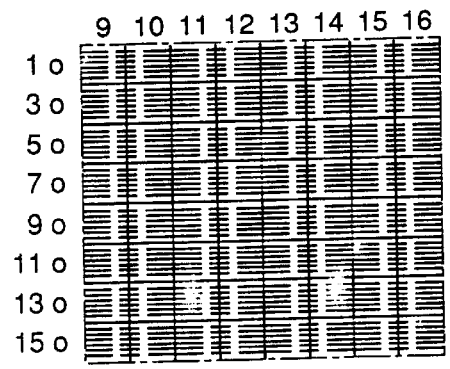
Figure 22D:
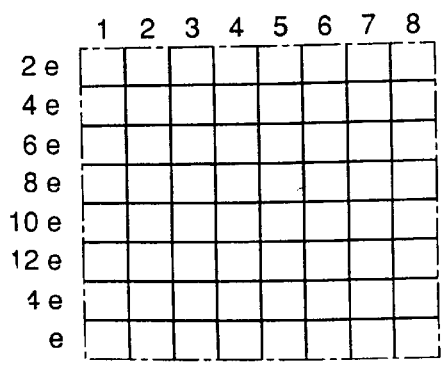
Figure 22E:
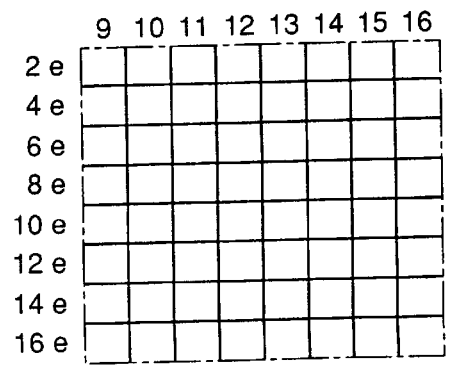

FIGS. 21A though 21E are illustrative drawings showing a macro block and unit blocks of the frame structure. FIGS. 22A through 22E are illustrative drawings showing a macro block and unit blocks of the field structure. FIG. 21A and FIG. 22A show the macro block including the four unit blocks used in MPEG1 and MPEG2. FIGS. 21B through 21E and FIGS. 22B through 22E are unit blocks, which have a size of 8 pixel by 8 pixel (8 pixel in the horizontal direction and 8 lines in the vertical direction). The macro blocks have a size of 16 pixels by 16 pixels (16 pixel in the horizontal direction and 16 lines in the vertical direction). The macro blocks of FIG. 21A and FIG. 22A are divided by thicker lines into the four unit blocks of FIGS. 21B through 21E and FIGS. 22B through 22E, respectively, having the size of 8 pixels by 8 pixels. Relations between each unit block and the macro blocks should be apparent by numbers and symbols provided beside the upper and left sides of the blocks.

In the figures, symbols; "o" and "e" provided beside the left sides of the blocks represents a pixel line (scanning line) of an odd field and a pixel line (scanning line) of an even field, respectively, when one picture is formed by 2-to-1 interlace scanning. Also, in the figures, pixel lines (scanning lines) of the odd field are marked by densely arranged horizontal lines. In MPEG1, an image formed by the progressive linear scanning is used for the highly efficient coding. Thus, when FIGS. 21A through 21E are used for a description of MPEG1, the symbols "o" and "e" should be ignored.

In FIG. 20, the bit stream provided at the input node 1 contains the attached information, which includes picture-structure information indicating either one of the frame structure (using one frame as a unit for coding) or the field structure (using one field as a unit for coding) and information on the orthogonal transformation mode, in addition to the block-quantization-step-size information, the motion vector information, the information on the prediction mode, etc., previously described. The variable-length decoding unit 9 receiving the bit stream via the buffer memory 8 decodes the image data and the attached information which includes the picture structure information and the information on the orthogonal transformation modes as well as other information.

The image data and the attached information (the block-quantization-step-size information, the picture structure information, and the information on the orthogonal transformation mode) decoded by the variable-length decoding unit 9 are provided to the inverse-quantization unit 10. The motion vector information and the information on the prediction mode decoded by the variable-length decoding unit 9 are provided to the motion-compensation unit 13.

In the image-data decoding device of FIG. 20 according to the ninth embodiment, the decoded image data output from the image memory 14 of the decoder integrated circuit enclosed by the dashed line 3 is provided to the output node 2 via the low-pass filter 50.

The highly efficient coding of moving picture information through MPEG1 or MPEG2 uses a combination of intra-frame coding through the two-dimensional Discreet Cosine Transform (two-dimensional DCT) and inter-frame coding, and, also, employs the motion-compensation prediction and the inter-frame prediction as previously described. However, only the image formed by the progressive linear scanning is used in MPEG1 for the highly efficient coding of the moving picture, whereas the image formed by the interlace scanning can also be used in MPEG2.

Accordingly, there are two different orthogonal transformation modes in MPEG2. A first orthogonal transformation mode is the same as that used in MPEG1, in which DCT is applied to each unit block having the 8-pixel-by-8-pixel size generated by dividing one frame of the image data. In a second orthogonal transformation mode, DCT is applied to the unit block formed from the image data of the odd field and to the unit block formed from the image data of the even field, wherein the odd field and the even field are generated by the interlace scanning.

The macro block and the unit blocks of the first orthogonal transformation mode are shown in FIGS. 21A through 21E. As previously noted, relations between the macro block and the unit blocks are apparent by the numbers and the symbols provided beside the upper and left sides of the blocks. Also, since image data formed by progressive linear scanning is used in MPEG1, the symbols "o" and "e" in FIGS. 21A through 21E should be ignored when MPEG1 is considered.

The macro block and the unit blocks of the second orthogonal transformation mode are shown in FIGS. 22A through 22E. As in FIGS. 21A through 21E, relations between the macro block and the unit blocks are apparent by the numbers and the symbols provided in the figures.

The image-data decoding device of FIG. 20 according to the ninth embodiment reduces the quantization noise by applying a low-pass filtering operation to the decoded image.

When some macro blocks are subjected to the first orthogonal transformation made and other macro blocks to the second orthogonal transformation mode, a simple low-pass filtering applied to each frame of the decoded image will result in a moving picture having an unnatural appearance of motion. When a moving picture contains large scale motion, there is little correlation between two fields. Thus, the low-pass filtering of the two fields together in one frame leads to a decrease in a temporal resolution and to the unnatural appearance of motion. In order to address this problem, the image-data decoding device of FIG. 20 employs a different technique for the low-pass filtering of the decoded image.

In FIG. 20, an orthogonal-transformation-information detecting unit 51 is provided to perform a similar function to that of the variable-length decoding unit 9. The bit stream applied to the input node 1 is provided to the orthogonal-transformation-information detecting unit 51 via the buffer memory 4 serving as a First-In-First-Out memory. The orthogonal-transformation-information detecting unit 51 extracts the picture structure information and the information on the orthogonal transformation mode, and provides this information to the control-signal generating unit 52.

The control-signal generating unit 52 uses the picture structure information and the information on the orthogonal transformation mode to determine whether the field structure or the frame structure is used in the orthogonal transformation. The reason why this determination is made based con both the picture structure information and the information on the orthogonal transformation mode is because the orthogonal transformation mode is not defined, and, thus, not contained in the bit stream when the picture structure (defined for one picture) is the field structure. That is, when the picture structure (defined for one picture) is the frame structure, the information on the orthogonal transformation mode indicates which structure is used in the orthogonal transformation for each block within the image. However, when the picture structure (defined for one picture) is the field structure, no orthogonal transformation mode is defined, so that the determination is made based only on the picture structure information. In this case, the structure used in the orthogonal transformation should be the field structure.

The control-signal generating unit 52 receiving the picture structure information and the information on the orthogonal transformation mode includes a memory 55, a controlling unit 56, a field-address generating unit 57, a frame-address generating unit 58, and a switch 59. The picture structure information and the information on the orthogonal transformation mode provided to the control-signal generating unit 52 is stored in the memory 55, and, also, is supplied to the controlling unit 56. The controlling unit 56 also receives a pixel address from the image memory 14.

When the information provided to the controlling unit 56 indicates that the field structure is used in the orthogonal transformation, the controlling unit 56 generates a control signal to control the switch 59 to couple a movable node V to a fixed node I. On the other hand, the information provided to the controlling unit 56 indicates that the frame structure is used in the orthogonal transformation, the controlling unit 56 generates a control signal to control the switch 59 to couple the movable node V to a fixed node R.

When the field structure is used in the orthogonal transformation and the movable node V is coupled to the fixed node I, a field-address signal generated by the field-address generating unit 57 is supplied from the control-signal generating unit 52 to the image memory 14. The decoded image read from the image memory 14 based on the field-address supplied thereto is provided to the low-pass filter 50. Then, the low-pass filter 50 applies a low-pass filtering operation of the vertical direction to the decoded image data having the field structure. Filtered decoded image data is output from the output node 2.

Figure 23:
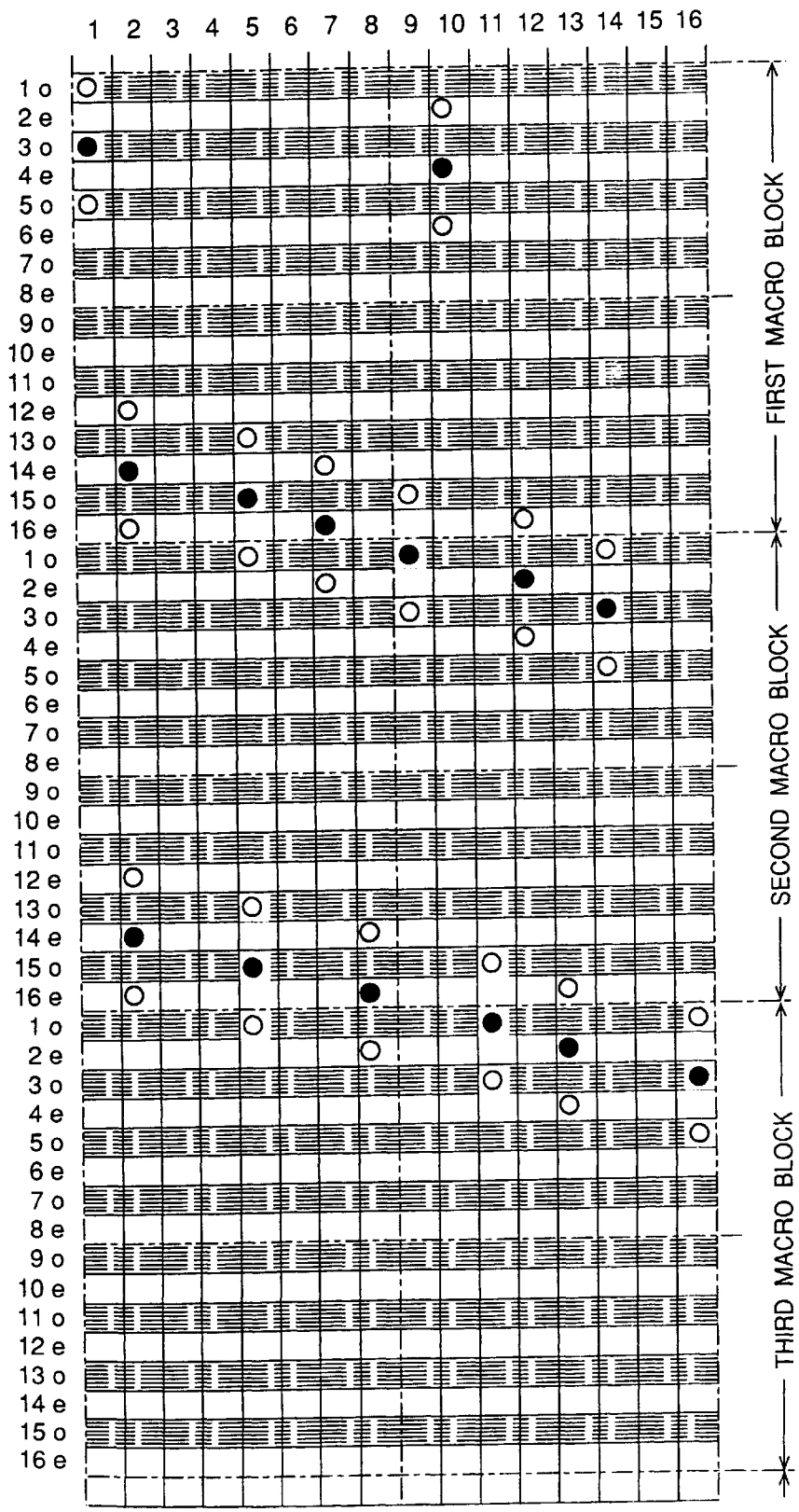
FIG. 23 is an illustrative drawing for explaining a low-pass filtering operation by a low-pass filter of FIG. 20 when the low-pass filtering operation is applied in the field structure.

FIG. 23 is an illustrative drawing for explaining the low-pass filtering operation by the low-pass filter 50 when the low-pass filtering operation is applied in the field structure. FIG. 23 is shown for a case in which a FIR filter having a filter length of three taps is used as the low-pass filter 50. In FIG. 23, three consecutive macro blocks, arranged in the vertical direction, are shown as part of the decoded image.

In FIG. 23, a set of three pixels indicated by a solid circle and two open circles on both sides thereof are pixels which are multiplied by three filter coefficients of the FIR filter having the filter length of three taps. Such sets of three pixels include, for example, three pixels in column 10 of lines 2e, 4e, and 6e of the first macro block and three pixels in column 5 of line 13o and line 15o of the second macro block and of line lo of the third macro block.

For the sake of clarity, only a small number of sets of three pixels are shown in FIG. 23. In reality, the set of three pixels is shifted by one pixel to the right in the horizontal direction as the filtering operation proceeds. That is, when the first set of three pixels in the filtering operation is pixels in column 1 of line 1o, 3o, and 5o, the second set of three pixels in the filtering operation is pixels in column 2 of line 1o, 3o, and 5o. When the filtering operation comes to the end in the horizontal direction (rightmost pixels), the filtering operation returns to the leftmost pixels with a one-pixel downward shift in the vertical direction. Thus, the filtering operation restarts from the pixels in column 1 of line 2e, 4e, and 6e.

As described above, when the movable node V of the switch 59 is coupled to the fixed node I, the field address is generated by the field-address generating unit 57 to be supplied to the image memory 14 such that the low-pass filtering operation is applied as shown in FIG. 23 to the decoded image data read from the image memory 14. The decoded image data to which the low-pass filtering operation of the vertical direction is applied is output at the output node 2.

Cases in which the movable node V of the switch 59 is coupled to the fixed node I include a case where the picture structure information indicates the field structure and a case where the information on the orthogonal transformation mode indicates the field DCT. In addition, there is an operation mode in which the movable node V of the switch 59 is coupled to the fixed node I irrespective of the attached information (the picture structure information and the information on the orthogonal transformation mode).

When the low-pass filtering operation in the field structure is applied to the decoded image data irrespective of the attached information, the quantization noise is reduced without degrading the temporal resolution. This is especially advantageous when the decoded image contains large scale motion.

When the frame structure is used in the orthogonal transformation and, thus, the movable node V is coupled to the fixed node R, a frame-address signal generated by the frame-address generating unit 58 is supplied from the control-signal generating unit 52 to the image memory 14. The decoded image read from the image memory 14 based on the frame-address supplied thereto is provided to the low-pass filter 50. Then, the low-pass filter 50 applies a low-pass filtering operation of the vertical direction to the decoded image data having the frame structure. Filtered encoded image data is output from the output node 2.

Figure 24:
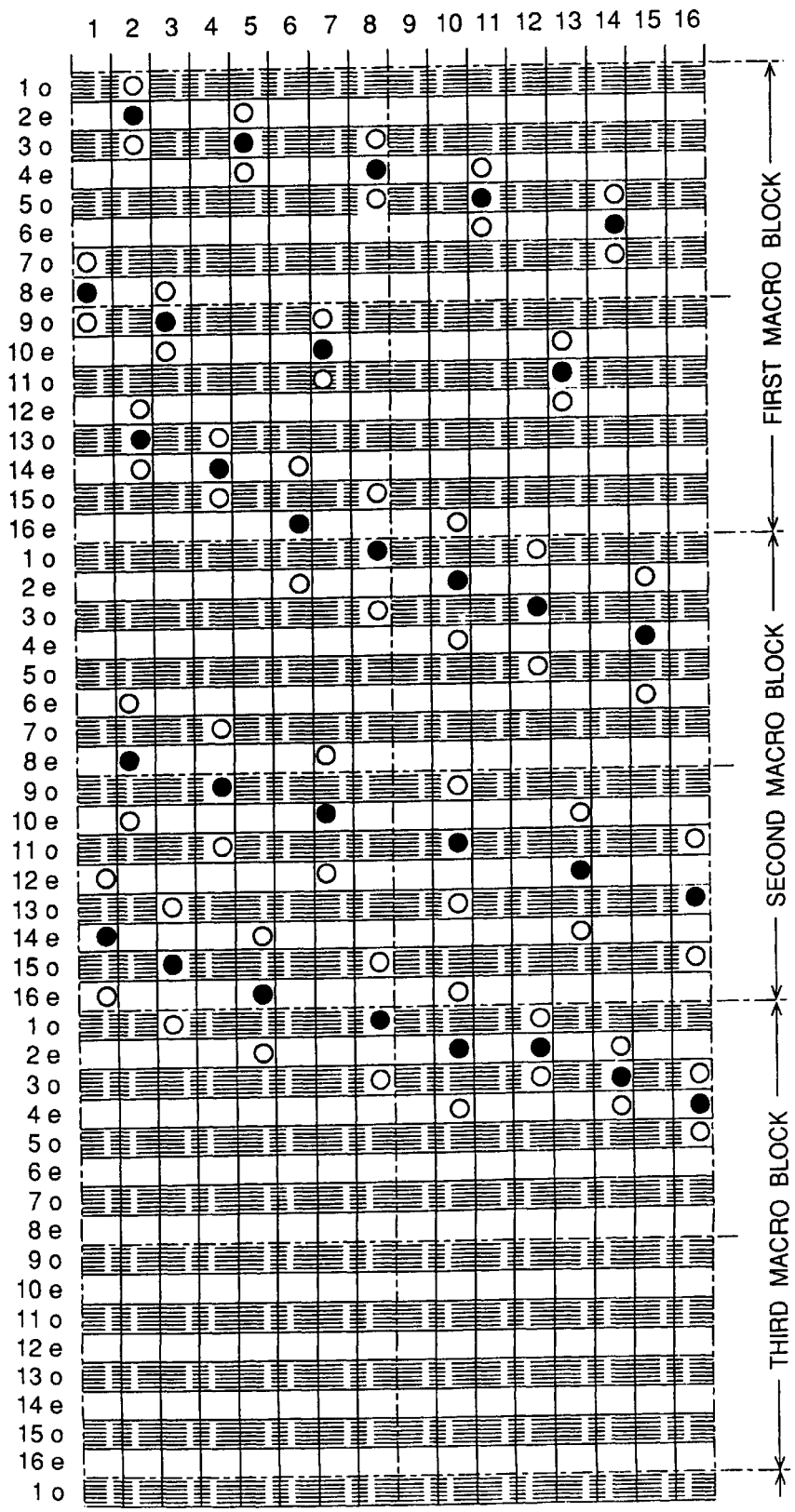
FIG. 24 is an illustrative drawing for explaining another low-pass filtering operation by the low-pass filter when the low-pass filtering operation switches between the field structure and the frame structure.

FIG. 24 is an illustrative drawing for explaining the low-pass filtering operation by the low-pass filter 50 when the low-pass filtering operation switches between the field structure and the frame structure. FIG. 24 is shown for a case in which a FIR filter having a filter length of three taps is used as the low-pass filter 50. In FIG. 24, three consecutive macro blocks, arranged in the vertical direction, are shown as part of the decoded image. The first and third macro blocks are blocks of the first orthogonal transformation mode, and the second macro block is a block of the second orthogonal transformation mode.

In FIG. 24, a set of three pixels indicated by a solid circle and two open circles on both sides thereof are pixels which are multiplied by three filter coefficients of the FIR filter having the filter length of three taps. Such sets of three pixels include, for example, three pixels in column 8 of lines 3o, 4e, and 5o of the first macro block and three pixels in column 15 of line 2e, 4e, and 6e of the second macro block.

As mentioned above, the first and third macro blocks are blocks of the first orthogonal transformation mode, and the second macro block is a block of the second orthogonal transformation mode. When the consecutive macro blocks arranged in the vertical direction have different orthogonal transformation modes as in this ease, the low-pass filtering operation is carried out as shown in FIG. 24.

In the first macro block of FIG. 24, three pixels adjoining each other in the vertical direction are multiplied by the filter coefficients when the three pixels fall within a range from line 1o to line 15o. However, when a set of three pixels starts from line 14e of the first macro block, the lowermost pixel of the three is located in the border between the first macro block and the second macro block. Thus, three pixels subjected to the low-pass filtering operation are chosen by picking two pixels of column 6 of lines 14e and 16e of the first macro block and one pixel of column 6 of line 2e of the second macro block.

Namely, three pixels in a proximity of the border between a macro block of the first orthogonal transformation mode and a macro block of the second orthogonal transformation mode are chosen by picking every other pixel in the vertical direction, even if the three pixels adjoining each other could be arranged within a macro block of the first orthogonal transformation mode.

In the proximity of the border between the second macro block and the third macro block of FIG. 24, the set of three pixels which are arranged in every other line and start within the second macro block of the second orthogonal transformation mode will extend into line 4e of the third macro block of the first orthogonal transformation mode.

As described above, the control-signal generating unit 52 generates the field addresses or the frame addresses based on the picture structure information and the information on the orthogonal transformation mode. These two types of information on the current macro block are directly provided from the orthogonal-transformation-information detecting unit 51. On the other hand, these two types of information on the previous macro blocks arranged in the vertical direction are stored in the memory 55, and provided therefrom. The control-signal generating unit 52 also uses the pixel address provided from the image memory 14 for generating the field addresses or the frame addresses. In this manner, an optimal low-pass filtering operation is applied to each macro block of the image.

As for the characteristics of the low-pass filter used in the low-pass filtering operation, a cut-off frequency of the low-pass filter used in the filtering of the pixels arranged in every other line is preferably higher than that used for filtering adjoining pixels. In other words, it is preferable that a cut-off frequency of the low-pass filter used in the field structure is higher than that used in the frame structure. Alternately, an attenuation rate of the frequency band in which a gain reduction is expected through the filtering operation is preferably lower for the field structure than for the frame structure. That is, a cut-off characteristic curve of the low-pass filter used in the field structure preferably has a less steep slope than that of the filter used in the frame structure. This may be achieved by a configuration in which the controlling unit 56 provides the low-pass filter 50 with the control signal which determines the type of an address signal supplied to the image memory 14.

Figure 25:
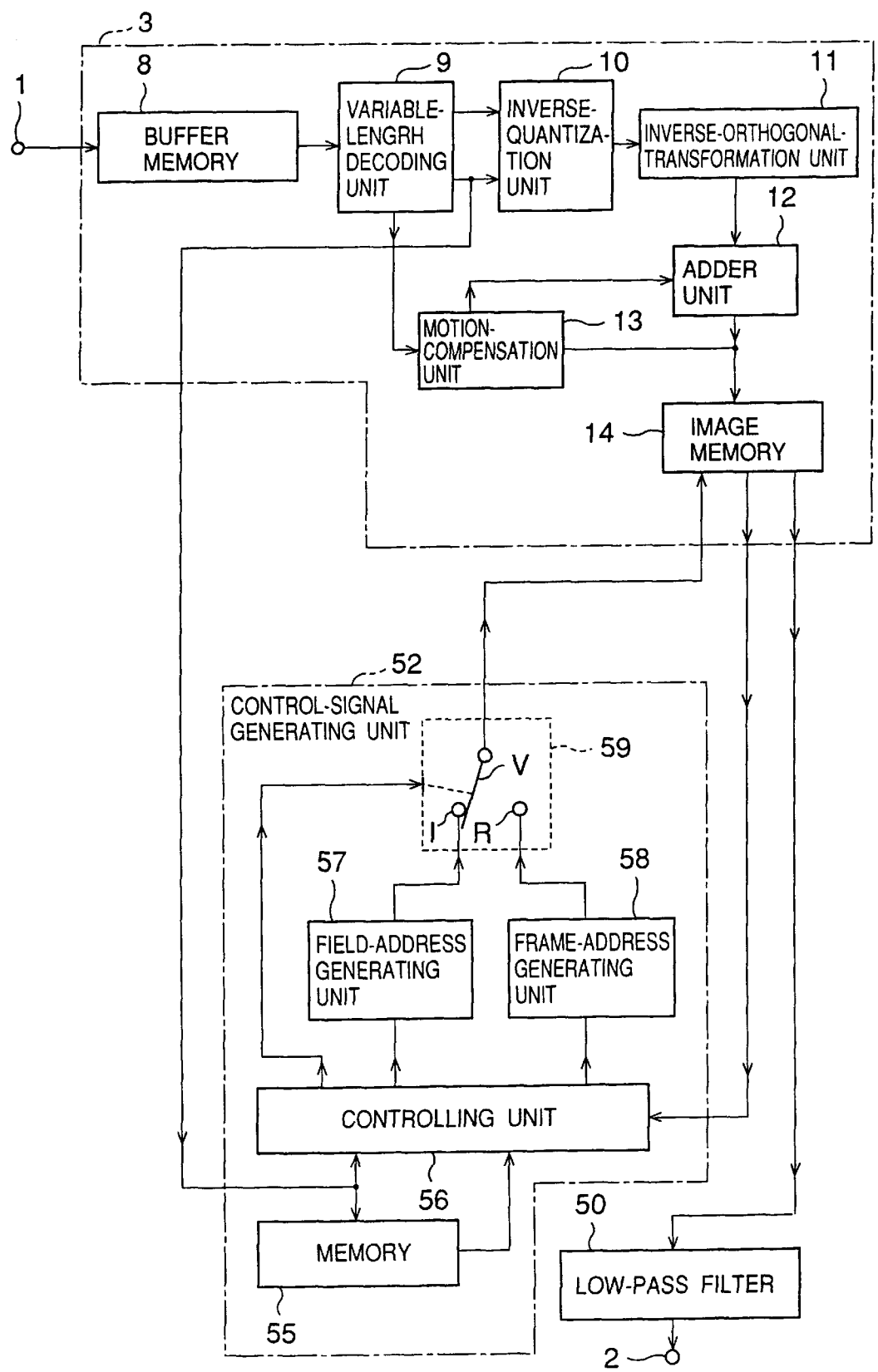
FIG. 25 is a block diagram of an image-data decoding device according to a tenth embodiment of the present invention.

FIG. 25 is a block diagram of an image-data decoding device according to a tenth embodiment of the present invention. In FIG. 25, the same elements as those of FIG. 20 are referred to by the same numerals, and a description thereof will be omitted.

The image-data decoding device of FIG. 25 differs from that of FIG. 20 only in that the picture structure information and the information on the orthogonal transformation mode detected by the variable-length decoding unit 9 are taken out from the decoder integrated circuit enclosed by the dashed line 3 to be supplied to the control-signal generating unit 52. Thus, the image-data decoding device of FIG. 25 does not need the buffer memory 4 or the orthogonal-transformation-information detecting unit 51 shown in FIG. 20.

The configuration of FIG. 25 is possible when the output signals of the variable-length decoding unit 9 can be taken out from the decoder integrated circuit indicated by the dashed line 3. When the output signals cannot be taken out, the configuration of FIG. 20 should be used instead.

As described above, according to the ninth and tenth embodiment of the present invention, the low-pass filtering of the decoded image in the vertical direction is carried out in the field structure or in the frame structure depending on the type of structure used in the orthogonal transformation. Namely, when the field structure is used in the orthogonal transformation of a given macro block, the low-pass filtering operation in the field structure is applied to the given macro block. When the frame structure is used in the orthogonal transformation of a given macro block, the low-pass filtering operation in the frame structure is applied to the given macro block.

Also, when filtering in the proximity of the border between a macro block using the first orthogonal transformation mode and a macro block using the second orthogonal transformation mode, the low-pass filtering operation is carried out in the field structure. Furthermore, the image-data decoding device of the ninth and tenth embodiments of the present invention can operate in a mode in which the low-pass filtering operation of the decoded image is conducted in the field structure irrespective of the type of structure used in the orthogonal transformation mode.

Accordingly, the quantization noise including the mosquito noise and the block distortion is effectively reduced even for the decoded image data using the interlace scanning. The reduction of the quantization noise is especially effective when the image contains large scale motion, since the low-pass filtering operation in the field structure as in the ninth and tenth embodiments does not degrade the temporal resolution of the decoded image.

Further, the present invention is not limited to these embodiments, but other variations and modifications may be made without departing from the scope of the present invention.

What is claimed is:

1. A device for decoding coded image data divided into a plurality of blocks so as to generate decoded image data by applying an inverse orthogonal transformation to each block of said plurality of blocks, said device comprising:

a prediction-mode detecting unit detecting a prediction mode for said plurality of blocks, said prediction mode indicating one of an intra-frame coding mode and an inter-frame coding mode; and a variable-gain-low-pass filter reducing high frequency components of said decoded image data located in a predetermined proximity of borders of said plurality of blocks based on said prediction mode, said high frequency components having frequencies higher than a predetermined frequency wherein said variable-gain-low-pass filter comprises:

border determining means for determining whether a currently processed pixel is within said predetermined proximity of said borders;

low-frequency separating means for separating low frequency components of said decoded image data, said low frequency components having frequencies lower than said predetermined frequency;

high-frequency separating means for separating said high frequency components;

reducing means for reducing said high frequency components according to said prediction mode when said currently processed pixel is within said predetermined proximity of said borders; and combining means for combining said low frequency components and an output of said reducing means.

* * * * *